US012538379B2

(12) United States Patent
Ying et al.

(10) Patent No.: US 12,538,379 B2
(45) Date of Patent: Jan. 27, 2026

(54) COMMUNICATION METHOD AND APPARATUS FOR FACILITATING VEHICLE-TO-EVERYTHING SERVICE

(71) Applicant: HUAWEI TECHNOLOGIES CO., LTD., Guangdong (CN)

(72) Inventors: Jiangwei Ying, Beijing (CN); Yanmei Yang, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 340 days.

(21) Appl. No.: 18/166,231

(22) Filed: Feb. 8, 2023

(65) Prior Publication Data
US 2023/0189393 A1    Jun. 15, 2023

Related U.S. Application Data

(63) Continuation of application No. PCT/CN2021/108366, filed on Jul. 26, 2021.

(30) Foreign Application Priority Data

Aug. 10, 2020  (CN) .......................... 202010794805.3
Sep. 29, 2020  (CN) .......................... 202011050078.6

(51) Int. Cl.
*H04W 4/00* (2018.01)
*H04W 4/40* (2018.01)
(Continued)

(52) U.S. Cl.
CPC ............. *H04W 76/28* (2018.02); *H04W 4/40* (2018.02); *H04W 92/08* (2013.01); *H04W 92/18* (2013.01)

(58) Field of Classification Search
None
See application file for complete search history.

(56) References Cited

U.S. PATENT DOCUMENTS

2020/0107381 A1*  4/2020  Ahmad ................. H04W 88/04
2020/0120745 A1*  4/2020  Yang ..................... H04W 40/24
(Continued)

FOREIGN PATENT DOCUMENTS

CN          108307489 A      7/2018
CN          109479189 A      3/2019
(Continued)

OTHER PUBLICATIONS

LG Electronics et al., "New KI: DRX for pedestrian Ues," SA WG2 Meeting #139E (e-meeting), S2-2004752, Elbonia, Jun. 1-12, 2020, 2 pages.

(Continued)

*Primary Examiner* — Bob A Phunkulh
(74) *Attorney, Agent, or Firm* — Fish & Richardson P.C.

(57) ABSTRACT

This application relates to the field of communication technologies and discloses communication methods and apparatuses. One method includes: determining, by a first terminal device, a first discontinuous reception (DRX) parameter based on a transmission requirement of a first vehicle-to-everything (V2X) service, wherein the transmission requirement comprises a service requirement, and sending, by the first terminal device to a second terminal device, the first DRX parameter for proximity communication 5 (PC5) communication of the first V2X service between the first terminal device and the second terminal device.

18 Claims, 7 Drawing Sheets

(51) Int. Cl.
*H04W 76/28* (2018.01)
*H04W 92/08* (2009.01)
*H04W 92/18* (2009.01)

(56) References Cited

U.S. PATENT DOCUMENTS

| | | | |
|---|---|---|---|
| 2021/0051588 A1* | 2/2021 | Wu | H04W 56/001 |
| 2021/0297842 A1* | 9/2021 | Shrivastava | H04W 28/24 |
| 2022/0191733 A1* | 6/2022 | Ali | H04L 41/0806 |
| 2022/0361039 A1* | 11/2022 | Kim | H04W 28/0268 |
| 2023/0156854 A1* | 5/2023 | Cheng | H04W 24/10 |
| | | | 370/329 |
| 2023/0164696 A1* | 5/2023 | Yang | H04W 52/0216 |
| | | | 370/311 |
| 2023/0217232 A1* | 7/2023 | Cheng | H04L 67/61 |
| | | | 370/328 |
| 2023/0328840 A1* | 10/2023 | Cheng | H04W 8/005 |
| | | | 370/329 |
| 2023/0337140 A1* | 10/2023 | Miao | H04L 5/0053 |

FOREIGN PATENT DOCUMENTS

| | | |
|---|---|---|
| JP | 2019525607 A | 9/2019 |
| WO | 2018016882 A1 | 1/2018 |
| WO | 2018064477 A1 | 4/2018 |
| WO | 2018195947 A1 | 11/2018 |

OTHER PUBLICATIONS

LG Electronics, "New WID on NR sidelink enhancement," 3GPP TSG RAN Meeting #86, RP-193231, Sitges, Spain, Dec. 9-12, 2019, 6 pages.
International Search Report and Written Opinion in International Appln. No. PCT/CN2021/108366, mailed on Oct. 28, 2021, 15 pages (with English translation).
3GPP TR 23.786 V16.1.0, "3rd Generation Partnership Project; Technical Specification Group Services and System Aspects; Study on architecture enhancements for the Evolved Packet System (EPS) and the 5G System (5GS) to support advanced V2X services (Release 16)," Jun. 2019, 119 pages.
3GPP TS 23.287 V16.3.0, "3rd Generation Partnership Project; Technical Specification Group Services and System Aspects; Architecture enhancements for 5G System (5GS) to support Vehicle-to-Everything (V2X) services (Release 16)," Jul. 2020, 57 pages.
3GPP TS 38.304 V16.1.0, "3rd Generation Partnership Project; Technical Specification Group Radio Access Network; NR; User Equipment (UE) procedures in Idle mode and RRC Inactive state (Release 16)," Jul. 2020, 39 pages.
3GPP TS 38.331 V16.1.0, "3rd Generation Partnership Project; Technical Specification Group Radio Access Network; NR; Radio Resource Control (RRC) protocol specification (Release 16)," Jul. 2020, 906 pages.
3GPP TS 38.321 V16.1.0, "3rd Generation Partnership Project; Technical Specification Group Radio Access Network; NR; Medium Access Control (MAC) protocol specification (Release 16)," Jul. 2020, 151 pages.
3GPP TS 38.300 V16.2.0, "3rd Generation Partnership Project; Technical Specification Group Radio Access Network; NR; NR and NG-RAN Overall Description; Stage 2 (Release 16)," Jul. 2020, 148 pages.
3GPP TS 36.331 V16.1.1, "3rd Generation Partnership Project; Technical Specification Group Radio Access Network; Evolved Universal Terrestrial Radio Access (E-UTRA); Radio Resource Control (RRC); Protocol specification (Release 16)," Jul. 2020, 1078 pages.
3GPP TR 23.776 V0.1.0, "3rd Generation Partnership Project; Technical Specification Group Services and System Aspects; Study on architecture enhancements for 3GPP support of advanced Vehicle-to-Everything (V2X) services; Phase 2 (Release 17)," Jun. 2020, 11 pages.
Extended European Search Report in European Appln No. 21855346.9, dated Dec. 13, 2023, 8 pages.
Office Action in Japanese Appln. No. 2023-509576, mailed on Feb. 26, 2024, 19 pages (with English translation).

* cited by examiner

COMMUNICATION METHOD AND APPARATUS FOR FACILITATING VEHICLE-TO-EVERYTHING SERVICE

CROSS-REFERENCE TO RELATED APPLICATIONS

This application is a continuation of International Application No. PCT/CN2021/108366, filed on Jul. 26, 2021, which claims priority to Chinese Patent Application No. 202010794805.3, filed on Aug. 10, 2020, and Chinese Patent Application No. 202011050078.6, filed on Sep. 29, 2020. All of the aforementioned patent applications are hereby incorporated by reference in their entireties.

TECHNICAL FIELD

Embodiments of this application relate to the field of communication technologies, and in particular, to a communication method and apparatus.

BACKGROUND

With upgrading of mobile communication technologies, many innovative applications are certainly introduced in various industries, and mobile broadband, multimedia, machine type communication (MTC), industrial control, and an intelligent transportation system (ITS) become main use cases in a 5G (5 generation) era. To meet widely changing service requirements, a 5G network is flexibly constructed. A potential direction is separation of network functions, to be specific, separation of a control plane (CP) function and a user plane (UP) function, and separation of a mobility management (MM) function and a session management (SM) function in the CP.

In a 5G network slice, a network slicing technology means that a physical network is sliced into a plurality of end-to-end virtual networks. Each virtual network, including a device, an access technology, a transmission path, and a core network in the virtual network, is logically independent. Each network slice includes an independent network function or is obtained by instantiating a combination of functions, has different function features targeting different requirements and services. Separation of network slices enables different users or user groups to define and customize network capabilities flexibly and dynamically based on different application scenarios and requirements, and the network slices do not affect each other.

Generally, a network slice includes a control plane function (CPF) entity and a user plane function (UPF) entity. The CPF entity mainly implements an access and mobility management function (AMF) such as access authentication, security encryption, and location registration of user equipment (UE) and a session management function (SMF) such as establishment, release, and change of a user plane transmission path. The UPF entity mainly implements functions such as user plane data routing and forwarding.

However, in proximity communication 5 interface (proximity communication 5, PC5) communication in a 5G network architecture, regardless of a PC5 communication mode (for example, a mode 1 or a mode 3) in which a network device schedules a PC5 communication resource for PC5 communication of a terminal device, or a PC5 communication mode (for example, a mode 2 or a mode 4) in which a transmitting (Tx) terminal device contends for a PC5 communication resource in PC5 communication resources preconfigured by a network device, for PC5 communication between the transmitting terminal device and a receiving (Rx) terminal device, when the transmitting terminal device needs to send data to the receiving terminal device, the transmitting terminal device directly sends the data by using the PC5 communication resource without considering a status of the receiving terminal device. Therefore, the receiving terminal device needs to continuously listen to to-be-received data (or a signal) on a PC5 interface. This causes problems such as excessive power consumption of the receiving terminal device.

SUMMARY

Embodiments of this application provide a communication method and apparatus, to resolve a problem that excessive power is consumed by a receiving terminal device because a transmitting terminal device always sends to-be-sent data during PC5 communication of a V2X service and the receiving terminal device needs to continuously listen to to-be-received data.

According to a first aspect, an embodiment of this application provides a communication method. The method includes: determining, by a first terminal device, a first discontinuous reception DRX parameter based on a transmission requirement of a first vehicle-to-everything V2X service, where the transmission requirement includes a service requirement and/or a message pattern; and sending, by the first terminal device, the first DRX parameter to a second terminal device, where the first DRX parameter is used for PC5 communication of the first V2X service between the first terminal device and the second terminal device. Optionally, the first terminal device is a transmitting terminal device, and the second terminal device is a receiving terminal device.

In this embodiment of this application, the first terminal device determines, based on the transmission requirement of the first V2X service, the first DRX parameter for performing PC5 communication with the second terminal device, and indicates the first DRX parameter to the second terminal device that performs PC5 communication of the first V2X service with the first terminal device. The first terminal device and the second terminal device may perform PC5 communication of the first V2X service based on the first DRX parameter. This can reduce energy consumed by the receiving (or receive-end) terminal device to listen to whether there is data from the transmitting (transmit-end) terminal device, and therefore reduce energy consumption of the receiving terminal device, thereby improving user experience.

In a possible design, the determining, by a first terminal device, a first DRX parameter based on a transmission requirement of a first V2X service includes: determining, by the first terminal device, the first DRX parameter based on the transmission requirement of the first V2X service and a transmission requirement of one or more third V2X services, where the one or more third V2X services are a V2X service being performed by the first terminal device.

In the foregoing design, when determining a DRX parameter that is of a V2X service and that is between the first terminal device and the second terminal device, the first terminal device may further consider a transmission requirement of a part or all of V2X services that are being performed by the first terminal device, for example, one or more of a transmission requirement of a V2X service in unicast PC5 communication that is being performed between the first terminal device and another terminal device, a transmission requirement of a V2X service in multicast PC5 communication that is being performed by the first terminal device, and a transmission requirement of a V2X service in broadcast PC5 communication that is being performed by the first terminal device, to reduce a quantity of DRX parameters used by the first terminal device, and implement better energy saving for PC5 communication.

In a possible design, the method further includes: receiving, by the first terminal device, an acknowledgment message from the second terminal device, where the acknowledgment message indicates that the second terminal device accepts the first DRX parameter; and performing, by the first terminal device, PC5 communication of the first V2X service with the second terminal device based on the first DRX parameter. Optionally, the performing, by the first terminal device, PC5 communication of the first V2X service with the second terminal device based on the first DRX parameter includes: receiving, by the first terminal device based on the first DRX parameter, data that is of the first V2X service and that is sent by the second terminal device; or receiving, by the first terminal device based on the first DRX parameter, data that is of the first V2X service and that is sent by the second terminal device, and sending data of the first V2X service to the second terminal device based on the first DRX parameter.

In the foregoing design, after the second terminal device determines to accept the first DRX parameter provided by the first terminal device, the first terminal device performs PC5 communication of the first V2X service with the second terminal device based on the first DRX parameter. This helps the first terminal device and the second terminal device perform PC5 communication of the first V2X service based on a unified DRX parameter, and ensures communication reliability.

In a possible design, the method further includes: receiving, by the first terminal device, a second message from the second terminal device, where the second message includes a second DRX parameter, and the second DRX parameter is used for PC5 communication of the first V2X service between the first terminal device and the second terminal device; and performing, by the first terminal device, PC5 communication of the first V2X service with the second terminal device based on the second DRX parameter. Optionally, the performing, by the first terminal device, PC5 communication of the first V2X service with the second terminal device based on the second DRX parameter includes: receiving, by the first terminal device based on the second DRX parameter, data that is of the first V2X service and that is sent by the second terminal device; or receiving, by the first terminal device based on the second DRX parameter, data that is of the first V2X service and that is sent by the second terminal device, and sending data of the first V2X service to the second terminal device based on the second DRX parameter.

In the foregoing design, when the second terminal device does not accept the first DRX parameter provided by the first terminal device, the first terminal device performs PC5 communication of the first V2X service with the second terminal device based on the second DRX parameter provided by the second terminal device. This helps the second terminal device adjust, based on a communication status of the second terminal device, a DRX parameter for performing PC5 communication of the first V2X service, ensures communication reliability, and implements better energy saving for PC5 communication.

In a possible design, the method further includes: receiving, by the first terminal device, a second message from the second terminal device, where the second message includes a second DRX parameter, and the second DRX parameter is used for PC5 communication of the first V2X service between the first terminal device and the second terminal device; and performing, by the first terminal device, PC5 communication of the first V2X service with the second terminal device based on the first DRX parameter and the second DRX parameter. Optionally, the performing, by the first terminal device, PC5 communication of the first V2X service with the second terminal device based on the first DRX parameter and the second DRX parameter includes: receiving, by the first terminal device based on the first DRX parameter, data that is of the first V2X service and that is sent by the second terminal device, and sending data of the first V2X service to the second terminal device based on the second DRX parameter.

In the foregoing design, based on the first DRX parameter that is provided by the first terminal device and that is applicable to the first terminal device, the second terminal device may further provide the second DRX parameter that is applicable to the second terminal device. The first terminal device and the second terminal device perform PC5 communication of the first V2X service based on the first DRX parameter and the second DRX parameter. That is, the first terminal device and the second terminal device each have a DRX parameter for waking up to receive data, which helps ensure communication reliability.

In a possible design, the first DRX parameter is carried in a first message, and the first message further includes the transmission requirement.

In the foregoing design, the transmission requirement of the first V2X service is provided for the second terminal device that performs PC5 communication of the first V2X service with the first terminal device. This helps the second terminal device accurately determine the second DRX parameter for performing PC5 communication of the first V2X service with the first terminal device, ensures communication reliability, and implements better energy saving for PC5 communication.

In a possible design, when the first DRX parameter does not meet a transmission requirement of a second V2X service, the method further includes: sending, by the first terminal device, a third DRX parameter to the second terminal device based on the transmission requirement of the second V2X service, where the third DRX parameter is used for PC5 communication of the second V2X service between the first terminal device and the second terminal device; or sending, by the first terminal device, a fourth DRX parameter to the second terminal device based on the transmission requirement of the second V2X service and the transmission requirement of the first V2X service, where the fourth DRX parameter is used for PC5 communication of the first V2X service and the second V2X service between the first terminal device and the second terminal device.

In the foregoing design, when there is a new V2X service, the first terminal device and the second terminal device may re-determine a new DRX parameter or add a new DRX parameter. This helps ensure reliability of performing the new V2X service by the first terminal device and the second terminal device, and implements better energy saving for PC5 communication.

In a possible design, the determining, by a first terminal device, a first DRX parameter based on a transmission requirement of a first V2X service includes: sending, by a V2X layer of the first terminal device, the transmission requirement of the first V2X service to an access stratum of the first terminal device; and determining, by the access stratum of the first terminal device, the first DRX parameter based on the transmission requirement of the first V2X service. Optionally, the method further includes: sending, by the V2X layer of the first terminal device, DRX indication information to the access stratum of the first terminal device, where the DRX indication information indicates to obtain a DRX parameter for the first terminal device; and determining, by the access stratum of the first terminal device, the first DRX parameter based on the DRX indication information and the transmission requirement of the first V2X service.

In a possible design, the method further includes: receiving, by the first terminal device, a fifth DRX parameter of the first terminal device from a network device; and the determining, by a first terminal device, a first DRX parameter based on a transmission requirement of a first V2X service includes: determining, by the first terminal device, the first DRX parameter based on the transmission requirement of the first V2X service and the fifth DRX parameter of the first terminal device.

In the foregoing design, the first terminal device may determine, based on the transmission requirement of the first V2X service and the fifth DRX parameter of the first terminal device that is indicated by the network device, the first DRX parameter for performing PC5 communication with the second terminal device. This not only can reduce energy consumed by the receiving (or receive-end) terminal device to listen to whether there is data from the transmitting (transmit-end) terminal device, but also can reduce energy consumed by the sending terminal device to listen to Uu interface scheduling information (that is, listen to scheduling information from the network device).

In a possible design, the service requirement of the first V2X service includes a QoS parameter of at least one PC5 quality of service QoS flow that is for transmitting the first V2X service and that is between the first terminal device and the second terminal device, and the QoS parameter includes a data packet transmission delay requirement.

In a possible design, the at least one PC5 QoS flow includes a first PC5 QoS flow and a second PC5 QoS flow, and the first DRX parameter includes a DRX parameter corresponding to the first PC5 QoS flow and a DRX parameter corresponding to the second PC5 QoS flow, where the DRX parameter corresponding to the first PC5 QoS flow is used by the first terminal device and the second terminal device to perform PC5 communication of the first V2X service based on the first PC5 QoS flow, and the DRX parameter corresponding to the second PC5 QoS flow is used by the first terminal device and the second terminal device to perform PC5 communication of the first V2X service based on the second PC5 QoS flow. Optionally, the determining, by a first terminal device, a first DRX parameter based on a transmission requirement of a first V2X service includes: determining, based on a QoS parameter of the first PC5 QoS flow, the DRX parameter corresponding to the first PC5 QoS flow; and determining, based on a QoS parameter of the second PC5 QoS flow, the DRX parameter corresponding to the second PC5 QoS flow.

In the foregoing design, the first terminal device may determine a corresponding DRX parameter based on each PC5 QoS flow of the first V2X service. This helps ensure reliability of communication between the first terminal device and the second terminal device, and implements better energy saving for PC5 communication.

In a possible design, the method further includes: sending, by the first terminal device, the first DRX parameter to a network device; sending, by the first terminal device, the second DRX parameter to a network device; or sending, by the first terminal device, the first DRX parameter and the second DRX parameter to the network device.

In the foregoing design, the first terminal device may report, to the network device, the DRX parameter for performing PC5 communication with the second terminal device. This helps the network device schedule a PC5 communication resource for the first terminal device and the second terminal device based on the DRX parameter for performing PC5 communication by the first terminal device and the second terminal device, and can reduce energy consumed by the transmitting terminal device to listen to Uu interface scheduling information (that is, listen to scheduling information from the network device).

According to a second aspect, an embodiment of this application provides a communication method. The method includes: receiving, by a second terminal device, a first discontinuous reception DRX parameter from a first terminal device, where the first DRX parameter is used for PC5 communication of a first V2X service between the first terminal device and the second terminal device; and performing, by the second terminal device, PC5 communication of the first V2X service with the first terminal device based on the first DRX parameter. Optionally, the performing, by the second terminal device, PC5 communication of the first V2X service with the first terminal device based on the first DRX parameter includes: sending, by the second terminal device, data of the first V2X service to the first terminal device based on the first DRX parameter; or sending, by the second terminal device, data of the first V2X service to the first terminal device based on the first DRX parameter, and receiving, based on the first DRX parameter, data that is of the first V2X service and that is sent by the first terminal device.

In this embodiment of this application, the second terminal device may perform PC5 communication of the first V2X service with the first terminal device based on the first DRX parameter provided by the first terminal device. This can reduce energy consumed by a receiving (or receive-end) terminal device to listen to whether there is data from a transmitting (transmit-end) terminal device, and therefore reduce energy consumption of the receiving terminal device, thereby improving user experience.

In a possible design, the method further includes: receiving, by the second terminal device, a third DRX parameter from the first terminal device, where the third DRX parameter is used for PC5 communication of a second V2X service between the first terminal device and the second terminal device; and performing, by the second terminal device, PC5 communication of the first V2X service and the second V2X service with the first terminal device based on the first DRX parameter and the third DRX parameter respectively.

In the foregoing design, when there is a new V2X service, a DRX parameter may be newly added for the second terminal device and the first terminal device, and the first terminal device and the second terminal device may perform PC5 communication of the new V2X service based on the newly added DRX parameter. This helps ensure reliability of communication between the first terminal device and the second terminal device.

In a possible design, the method further includes: receiving, by the second terminal device, a fourth DRX parameter from the first terminal device, where the fourth DRX parameter is used for PC5 communication of the first V2X service and the second V2X service between the first terminal device and the second terminal device; and performing, by the second terminal device, PC5 communication of the first V2X service and the second V2X service with the first terminal device based on the fourth DRX parameter.

In the foregoing design, when there is a new V2X service, the first terminal device and the second terminal device may re-determine a DRX parameter. This helps ensure reliability of communication between the first terminal device and the second terminal device, and implements better energy saving for PC5 communication.

According to a third aspect, an embodiment of this application provides a communication method. The method includes: receiving, by a second terminal device, a first discontinuous reception DRX parameter from a first terminal device, where the first DRX parameter is used for PC5 communication of a first V2X service between the first terminal device and the second terminal device; determining, by the second terminal device, a second DRX parameter based on the first DRX parameter and/or a transmission requirement of one or more fourth V2X services, where the transmission requirement includes a service requirement and/or a message pattern, and the one or more fourth V2X services are a V2X service being performed by the second terminal device; sending, by the second terminal device, the second DRX parameter to the first terminal device, where the second DRX parameter is used for PC5 communication of the first V2X service between the first terminal device and the second terminal device; and performing, by the second terminal device, PC5 communication of the first V2X service with the first terminal device based on the second DRX parameter, or performing, by the second terminal device, PC5 communication of the first V2X service with the first terminal device based on the first DRX parameter and the second DRX parameter.

In the foregoing design, when the second terminal device receives the first DRX parameter provided by the first terminal device, the second terminal device may adjust or add, based on a communication status of the second terminal device, a DRX parameter for performing PC5 communication of the first V2X service, and the first terminal device and the second terminal device may perform PC5 communication of the first V2X service based on the second DRX parameter provided by the second terminal device or based on the first DRX parameter provided by the first terminal device and the second DRX parameter provided by the second terminal device. This helps ensure communication reliability and implements better energy saving for PC5 communication.

In a possible design, the performing, by the second terminal device, PC5 communication of the first V2X service with the first terminal device based on the second DRX parameter includes: sending, by the second terminal device, data of the first V2X service to the first terminal device based on the second DRX parameter; or receiving, by the second terminal device based on the second DRX parameter, data that is of the first V2X service and that is sent by the first terminal device, and sending data of the first V2X service to the first terminal device based on the second DRX parameter; and the performing, by the second terminal device, PC5 communication of the first V2X service with the first terminal device based on the first DRX parameter and the second DRX parameter includes: receiving, by the second terminal device based on the second DRX parameter, data that is of the first V2X service and that is sent by the first terminal device, and sending data of the first V2X service to the first terminal device based on the first DRX parameter.

In a possible design, the determining, by the second terminal device, a second DRX parameter based on a transmission requirement of one or more fourth V2X services includes: determining, by the second terminal device, the second DRX parameter based on the transmission requirement of the one or more fourth V2X services and a transmission requirement of the first V2X service.

In the foregoing design, the second terminal device determines, not only based on the transmission requirement of the one or more fourth V2X services that are being performed by the second terminal device but also based on the transmission requirement of the first V2X service, the second DRX parameter for performing PC5 communication of the first V2X service with the first terminal device. This helps ensure communication reliability and implement better energy saving for PC5 communication.

In a possible design, the first DRX parameter is carried in a first message, and the first message further includes the transmission requirement of the first V2X service or identification information of the first V2X service; and if the first message includes the identification information of the first V2X service, the method further includes: determining, by the second terminal device, the transmission requirement of the first V2X service based on the identification information of the first V2X service.

In the foregoing design, the second terminal device may directly receive the transmission requirement of the first V2X service sent by the first terminal device, to learn of the transmission requirement of the first V2X service; or may learn of the transmission requirement of the first V2X service based on the received identification information of the first V2X service. For example, the second terminal device searches for the transmission requirement of the first V2X service from transmission requirements of all V2X services stored in the second terminal device, or learns of the transmission requirement of the first V2X service by interacting with another device (for example, a network device). Different manners of determining the transmission requirement of the first V2X service are provided, to help meet different communication requirements.

According to a fourth aspect, an embodiment of this application provides a communication apparatus. The apparatus has a function of implementing the method according to any one of the first aspect or the possible designs of the first aspect. The function may be implemented by hardware, or by hardware by executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a processor and an interface circuit. The processor is coupled to the interface circuit, and is configured to implement a function in the method according to any one of the first aspect or the possible designs of the first aspect. It may be understood that the interface circuit may be a transceiver or an input/output interface. The apparatus may further include a memory, and the memory stores a program that may be executed by the processor to implement the function in the method according to any one of the first aspect or the possible designs of the first aspect.

In a possible design, the apparatus may be a first terminal device.

According to a fifth aspect, an embodiment of this application provides a communication apparatus. The apparatus has a function of implementing the method according to any one of the second aspect or the possible designs of the second aspect, or a function of implementing the method according to any one of the third aspect or the possible designs of the third aspect. The function may be implemented by hardware, or by hardware by executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a processor and an interface circuit. The processor is coupled to the interface circuit, and is configured to implement a function in the method according to any one of the second aspect or the possible designs of the second aspect, or is configured to implement a function in the method according to any one of the third aspect or the possible designs of the third aspect. It may be understood that the interface circuit may be a transceiver or an input/output interface. The apparatus may further include a memory. The memory stores a program that may be executed by the processor to implement a function in the method according to any one of the second aspect or the possible designs of the second aspect or the method according to any one of the third aspect or the possible designs of the third aspect.

In a possible design, the apparatus may be a second terminal device.

According to a sixth aspect, an embodiment of this application provides a computer-readable storage medium, storing a computer program or instructions. When the computer program or the instructions are executed by a communication apparatus, the communication apparatus is enabled to perform the method according to any one of the first aspect or the possible designs of the first aspect, the method according to any one of the second aspect or the possible designs of the second aspect, or the method according to any one of the third aspect or the possible designs of the third aspect.

According to a seventh aspect, an embodiment of this application further provides a computer program product, including a computer program or instructions. When the computer program or the instructions are executed by a communication apparatus, the method according to any one of the first aspect or the possible designs of the first aspect may be implemented, the method according to any one of the second aspect or the possible designs of the second aspect may be implemented, or the method according to any one of the third aspect or the possible designs of the third aspect may be implemented.

According to an eighth aspect, an embodiment of this application further provides a chip. The chip is configured to implement the method according to any one of the first aspect or the possible designs of the first aspect, implement the method according to any one of the second aspect or the possible designs of the second aspect, or implement the method according to any one of the third aspect or the possible designs of the third aspect.

According to a ninth aspect, an embodiment of this application further provides a communication system. The system includes a first terminal device and a second terminal device. The first terminal device is configured to perform the method according to any one of the first aspect or the possible designs of the first aspect. The second terminal device is configured to perform the method according to any one of the second aspect or the possible designs of the second aspect, or is configured to perform the method according to any one of the third aspect or the possible designs of the third aspect.

For technical effects that can be achieved in the fourth aspect to the ninth aspect, refer to the technical effects that can be achieved in the first aspect to the third aspect. Details are not described herein again.

DESCRIPTION OF EMBODIMENTS

The technical solutions provided in this application are applicable to a 5G network architecture, a future communication network architecture, and the like. The following describes some network architectures to which this application is applicable. In the following description, an example in which a terminal device is UE is used.

Figure 1:
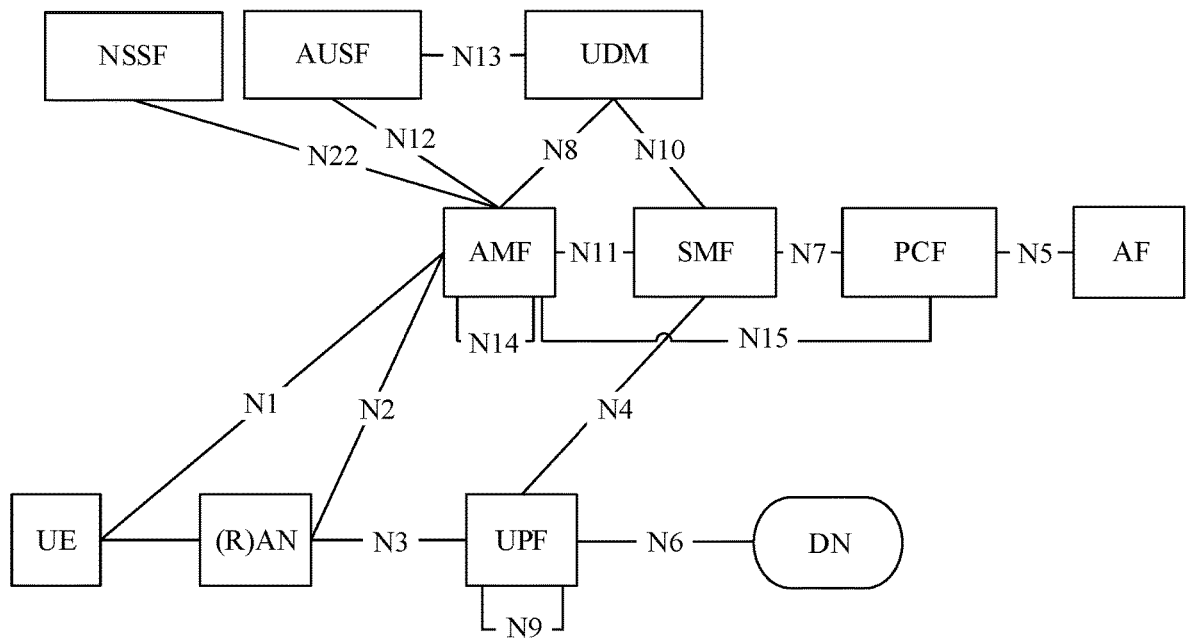
FIG. 1 is a schematic diagram of a network architecture to which an embodiment of this application is applicable.

FIG. 1 is a schematic diagram of a 5G network architecture. UE may communicate with an AMF network element by using a radio access network (RAN). The (radio) access network (R)AN may communicate with the AMF network element through an N2 interface. In addition, the UE may alternatively directly communicate with the AMF network element through an N1 interface. In addition, the (R)AN may further communicate with a UPF network element through an N3 interface. The UPF network element communicates with another UPF network element through an N9 interface. The UPF network element further communicates with a data network (DN) through an N6 interface, and communicates with an SMF network element through an N4 interface. The AMF network element communicates with another AMF network element through an N14 interface. The AMF network element further communicates with the SMF network element through an N11 interface, communicates with an authentication server function (AUSF) network element through an N12 interface, communicates with a user data management (UDM) network element through an N8 interface, communicates with a policy control function (PCF) network element through an N15 interface, and communicates with a network slice selection function (NSSF) network element through an N22 interface. The SMF network element communicates with the UDM network element through an N10 interface, and communicates with the PCF network element through an N7 interface. The PCF network element communicates with an application function (AF) network element through an N5 interface. The following briefly describes functions of some of the network elements.

A terminal device is a device having a wireless transceiver function. The terminal device may be deployed on land, including an indoor device, an outdoor device, a handheld device, or a vehicle-mounted device; may be deployed on water (for example, on a ship); or may be deployed in the air (for example, on a plane, a balloon, or a satellite). The terminal device may be a mobile phone, a tablet computer (pad), a computer having a wireless transceiver function, a virtual reality (virtual reality, VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, user equipment (UE), or the like.

The terminal device may establish a connection to a carrier network through an interface (for example, N1) provided by the carrier network, and use services such as a data service and/or a voice service provided by the carrier network. The terminal device may further access a DN through the carrier network, and use a carrier service deployed on the DN and/or a service provided by a third party. The third party may be a service provider other than the carrier network and the terminal device, and may provide services such as a data service and/or a voice service for the terminal device. A specific representation form of the third party may be specifically determined based on an actual application scenario, and is not limited herein.

The (R)AN may be a network including a plurality of 5G-RAN nodes, and mainly implements a radio physical layer function, resource scheduling and radio resource management, radio access control, and a mobility management function. The 5G-RAN may be connected to the UPF through a user plane interface (N3), and is configured to transmit data of the terminal device. The 5G-RAN establishes a control plane signaling connection to the AMF through a control plane interface (N2), to implement functions such as radio access bearer control. A RAN device is a device that provides a wireless communication function for the terminal device, and the RAN device is also referred to as an access network device or a network device. The RAN device includes but is not limited to a next generation NodeB (gNodeB, gNB), an evolved NodeB (eNB), a radio network controller (RNC), a NodeB (NodeB, NB), a base station controller (BSC), a base transceiver station (BTS), a home base station (for example, a home evolved NodeB or a home NodeB, HNB), a baseband unit (BBU), a transmitting and receiving point (transmitting and receiving point, TRP), a transmitting point (TP), a mobile switching center, and the like in 5G.

The AMF network element is mainly responsible for functions such as terminal device authentication, mobility management, network slice selection, and SMF network element selection; serves as an anchor for N1 and N2 signaling connections and provides routing of an N1/N2 session management (SM) message for the SMF network element; and maintains and manages terminal device status information.

The SMF network element is mainly responsible for all control plane functions in session management of the terminal device, including UPF network element selection, internet protocol (IP) address assignment, quality of service (QoS) management of a session, and obtaining a policy control and charging (PCC) policy (from the PCF network element).

The UPF network element serves as an anchor of a protocol data unit (PDU) session connection, and is responsible for data packet filtering, data transmission/forwarding, rate control, charging information generation, and the like of the user equipment.

The UDM network element mainly manages and controls user data, for example, subscription information management, including: obtaining subscription information from a unified data repository (UDR) network element and providing the subscription information to another network element (for example, the AMF network element); generating a 3GPP authentication credential for the terminal device; and registering and maintaining a network element currently serving the terminal device (for example, an AMF represented by an AMF ID 1 is a current serving AMF of the terminal device).

The UDR network element is mainly configured to store user data, including subscription data invoked by the UDM network element, policy information invoked by the PCF network element, structured data for capability exposure, and application data invoked by the network exposure function (NEF) network element.

The NEF network element, namely, the network exposure function network element, is used for connection and interaction between another internal network element of the core network and an external application server of the core network, to provide network capability information for the external application server, or provide information of the external application server for a core network element.

The AF network element (or entity) is an application service function, and interacts with a core network element to provide some services. For example, the AF network element interacts with the PCF network element to perform service policy control, interacts with the NEF network element to obtain some network capability information or provide some application information for a network, and provides some data network access point information for the PCF network element to generate routing information of a corresponding data service.

Figure 2:
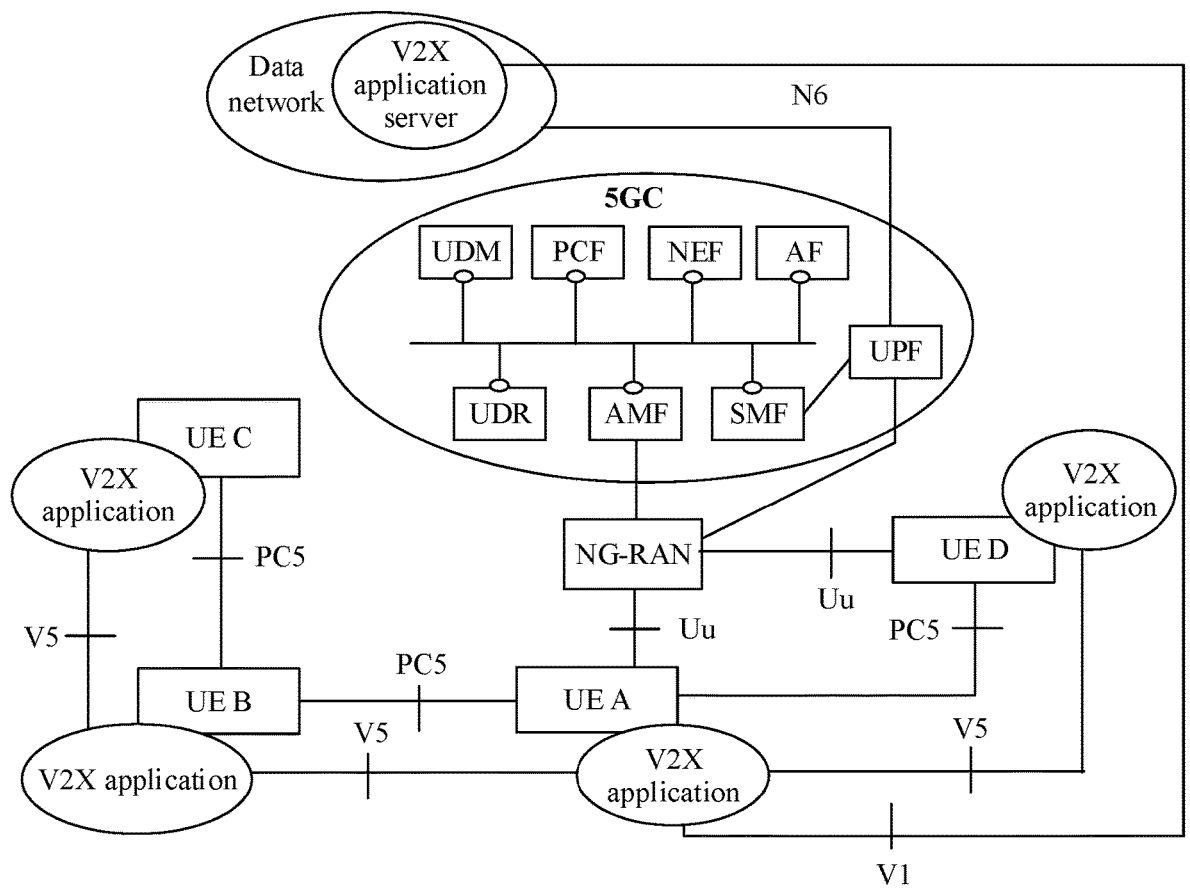
FIG. 2 is a schematic diagram of a V2X communication scenario to which an embodiment of this application is applicable.

FIG. 2 is a schematic diagram of a vehicle-to-everything (vehicle to everything, V2X) communication scenario in a 5G network architecture. For descriptions of functions of network elements in FIG. 2, refer to the descriptions of the functions of the corresponding network elements in FIG. 1. Details are not described again. A main difference between FIG. 2 and FIG. 1 lies in that interface information in the V2X communication scenario is added to the 5G network architecture in FIG. 2. V2X communication may be performed between two UEs (for example, between UE A and UE B) based on a PC5 interface. A V2X application layer of the UE may perform V2X communication with a V2X application server through a V1 interface. V2X application layer messages may be communicated between the two UEs through a V5 interface. The UE may communicate with a RAN through a Uu interface. For example, in a mode in which a network device schedules a PC5 communication resource for PC5 communication of the terminal device, when the UE needs to send data through the PC5 interface, the UE requests and obtains a corresponding PC5 communication resource from the RAN node through the Uu interface.

It should be understood that the 5G network architectures shown in FIG. 1 and FIG. 2 are merely used as examples, and are not intended to limit the technical solutions of this application. A person skilled in the art should understand that in a specific implementation procedure, the 5G network may further include another network element. In addition, a quantity of network elements or devices may be configured based on a specific requirement.

Before embodiments of this application are described, some terms in this application are first described, to help a person skilled in the art have a better understanding.

(1) V2X communication, including vehicle-to-vehicle (V2V) communication, vehicle to pedestrian (V2P) communication/P2V communication, pedestrian to pedestrian (P2P) communication, vehicle to roadside unit (vehicle to road side unit, V2(RSU)) communication, and the like, covers PC5 communication (also referred to as PC5 interface communication, communication on a PC5 interface, and the like) and Uu communication (also referred to as Uu interface communication, communication on a Uu interface, and the like). For example, some V2X services of a terminal device may be communicated with a V2X server through a Uu interface, and some V2X services may be directly communicated with another terminal device through a PC5 interface. Uu communication and PC5 communication may be performed in different frequency bands, or may be performed simultaneously. In embodiments of this application, PC5 communication of a V2X service means that two terminal devices directly send and receive data (or a V2X message) of the V2X service through a PC5 interface. For example, when a first terminal device and a second terminal device perform PC5 communication of a V2X service, the first terminal device sends data of the V2X service to the second terminal device on a PC5 interface, and the second terminal device receives, on the PC5 interface, the data of the V2X service sent by the first terminal device.

(2) A PC5 interface is a communication interface between two terminal devices. V2X communication may be performed between the two terminal devices based on the PC5 interface.

(3) A Uu interface is an interface between a terminal device and a RAN device (also referred to as a network device). In a PC5 communication mode 1 scheduled by the network device, when the terminal device needs to send data through a PC5 interface, the terminal device requests and obtains a corresponding PC5 communication resource from the RAN device through the Uu interface.

(4) A V5 interface is a V2X application layer logical interface between two terminal devices, and V2X application layer messages of the two terminal devices are communicated through a logical interface.

(5) A DRX parameter, namely, a discontinuous reception parameter, usually refers to a DRX cycle. A terminal device may periodically wake up from a sleep state based on the DRX parameter for communication.

In addition, it should be understood that in embodiments of this application, at least one may be alternatively described as one or more, and more may represent two, three, four, or more. This is not limited in this application. In embodiments of this application, "/" may represent an "or" relationship between associated objects. For example, AB may represent A or B. "And/or" may be used to indicate that there are three relationships between associated objects. For example, A and/or B may represent the following three cases: Only A exists, both A and B exist, and only B exists. A and B may be singular or plural. To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

This application aims to resolve a problem that excessive power is consumed by a receiving terminal device because a transmitting terminal device always sends to-be-sent data during PC5 communication of a V2X service and the receiving terminal device needs to continuously listen to to-be-received data. Specifically, in this application, when PC5 communication of a V2X service is performed between terminal devices, a DRX parameter is introduced. In this way, a receiving terminal device can periodically enter a sleep state and does not listen to to-be-received data on a PC5 interface, and the receiving terminal device wakes up, when listening is required, from the sleep state to listen to the to-be-received data on the PC5 interface, to avoid excessive power consumption.

For the DRX parameter, this application provides two possible negotiation solutions. Solution 1: A DRX parameter related to a V2X service between terminal devices is directly negotiated, and then the DRX parameter is notified to a network device. Solution 2: A DRX parameter between a terminal device and a network device is first negotiated, and then a DRX parameter related to a V2X service between terminal devices is negotiated based on the DRX parameter between the terminal device and the network device. Optionally, when a PC5 communication mode in which a network device does not need to participate in PC5 interface resource scheduling is used, two terminals directly negotiate a DRX parameter related to a V2X service between the terminal devices, and do not need to communicate with a network device. In other words, the DRX parameter does not need to be notified to the network device, and the DRX parameter related to the V2X service between the terminal devices does not need to be negotiated based on a DRX parameter between the terminal device and the network device.

The following describes embodiments of this application in detail with reference to the accompanying drawings.

Solution 1

Figure 3:
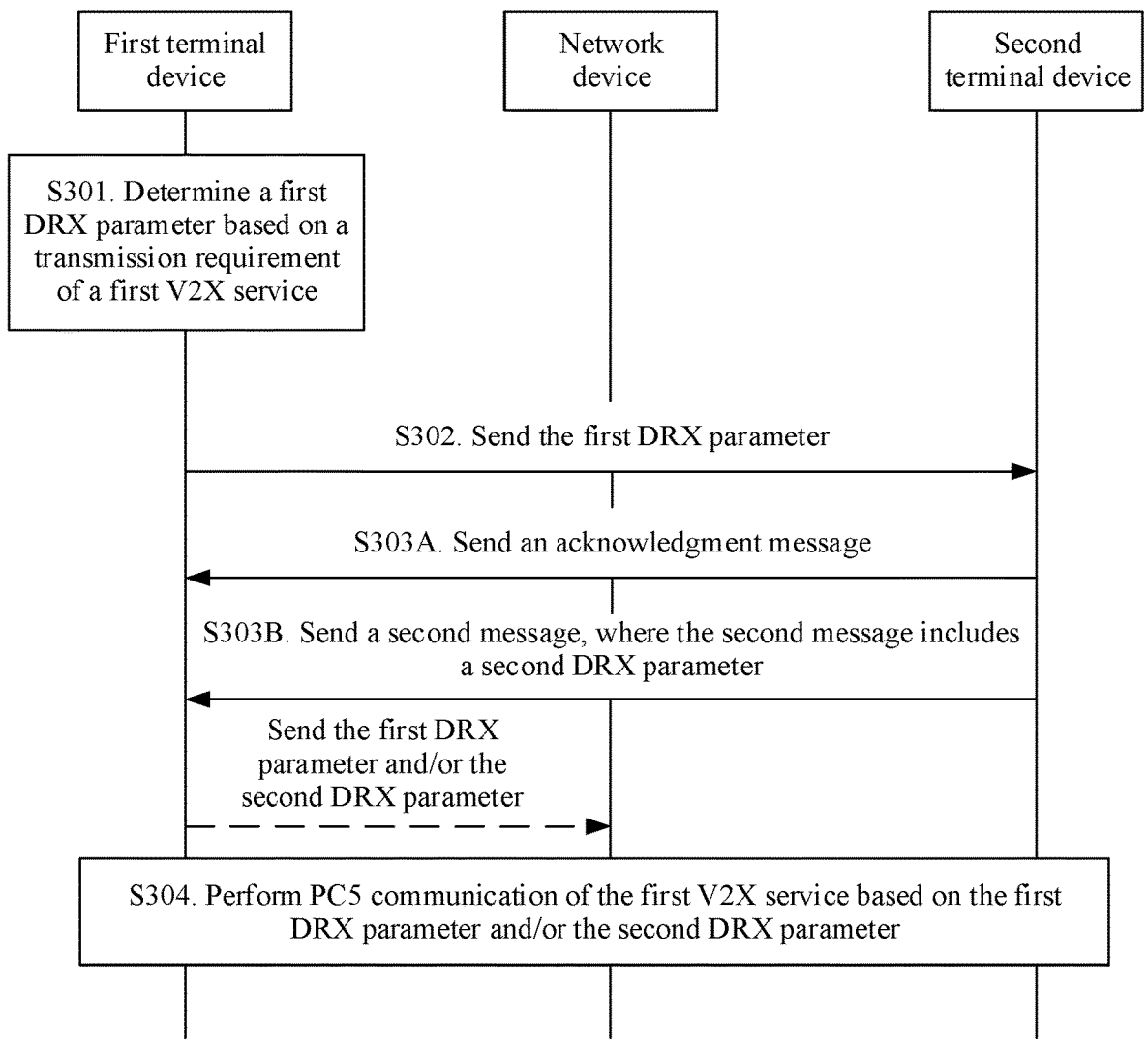
FIG. 3 is a schematic flowchart 1 of a communication method according to an embodiment of this application.

FIG. 3 is a schematic flowchart of a communication method according to an embodiment of this application. The method includes the following steps.

S301. A first terminal device determines a first DRX parameter based on a transmission requirement of a first V2X service.

The transmission requirement includes a service requirement and/or a message pattern.

In this embodiment of this application, the message pattern may also be referred to as a service pattern, and may be a sending frequency or a sending period for sending a V2X message. The first terminal device may use a same message pattern for all V2X services performed by the first terminal device, or may use a same message pattern or different message patterns for different V2X services performed by the first terminal device. In an example, a message pattern used by the first terminal device to perform any V2X service may be 100 ms, that is, a period of sending a V2X message for any V2X service by the first terminal device may be 100 ms.

A service requirement of a V2X service may be a data packet transmission delay requirement corresponding to the V2X service, for example, a delay not exceeding 50 ms. For ease of description, the data packet transmission delay requirement may also be referred to as a delay requirement in subsequent descriptions of this application, and is not described again. In a possible implementation, the service requirement of the V2X service may be alternatively a QoS parameter of one or more PC5 QoS flows for transmitting the V2X service, and the QoS parameter includes a delay requirement. The V2X service may be transmitted by using one or more PC5 QoS flows. In this embodiment of this application, the service requirement of the V2X service may be one QoS parameter corresponding to the one or more PC5 QoS flows for transmitting the V2X service, or may be a QoS parameter of each of the one or more PC5 QoS flows for transmitting the V2X service. In an example, the first V2X service is transmitted by using a first PC5 QoS flow and a second PC5 QoS flow, a QoS parameter of the first PC5 QoS flow includes a delay not exceeding 80 ms, a QoS parameter of the second PC5 QoS flow includes a delay not exceeding 50 ms, and the service requirement of the first V2X service may be a delay not exceeding 50 ms, that is, one QoS parameter, or may be the QoS parameter (including the delay not exceeding 80 ms) of the first PC5 QoS flow and the QoS parameter (including the delay not exceeding 50 ms) of the second PC5 QoS flow.

For determining of the first DRX parameter, the first DRX parameter needs to meet the message pattern and/or the service requirement of the first V2X service. If only the service requirement is considered, it is assumed that the service requirement of the message pattern of the first V2X service is that a delay does not exceed 50 ms. If the DRX parameter is set to 60 ms, and a wake-up time period in each DRX cycle is 5 ms, because 60 ms is greater than 50 ms, after a V2X message is triggered, the V2X message may be generated in a non-wake-up time period in the DRX cycle, resulting in a worst case (the V2X message is generated after a sleep state is entered). The V2X message can be sent only after 55 ms (the DRX parameter 60 ms minus the wake-up time period 5 ms in each DRX cycle). Therefore, the requirement that the delay does not exceed 50 ms cannot be met. In an example, the service requirement of the first V2X service of the first terminal device is that a delay does not exceed 50 ms. In this case, the first DRX parameter may be set to 30 ms, and a wake-up time period is 5 ms. In this case, in a worst case (a V2X message is generated after a sleep state is entered), a time period of 25 ms (the service requirement 50 ms minus (the first DRX cycle 30 ms minus 5 ms)) may still be obtained to transmit the V2X message. In this way, the V2X message can be easily sent to a second terminal device within 50 ms.

If the message pattern of the first V2X service is further considered, for example, it is assumed that the message pattern of the first V2X service is a sending period of 100 ms and the service requirement is that a delay does not exceed 50 ms. If the first DRX parameter is set to 60 ms, and a wake-up time period in each DRX period is 5 ms, because a sleep time period is 55 ms (the DRX parameter 60 ms minus the wake-up time period 5 ms in each DRX period), and is greater than the service requirement 50 ms, after a V2X message is triggered, in a worst case (the V2X message is generated after a sleep state is just entered), the V2X message can be sent only after 55 ms (the DRX parameter 60 ms minus the wake-up time period 5 ms in each DRX cycle) before being sent. Therefore, the requirement that the delay does not exceed 50 ms cannot be met. Therefore, at least one value less than the service requirement needs to be set, for example, 30 ms. It is assumed that the first DRX parameter is 30 ms, and is less than a sending period of 100 ms. In this case, the terminal wakes up at a moment such as the $0^{th}$ ms, the $30^{th}$ ms, the $60^{th}$ ms, the $90^{th}$ ms, the $120^{th}$ ms, the $150^{th}$ ms, the $180^{th}$ ms, the $210^{th}$ ms, the $240^{th}$ ms, the $270^{th}$ ms or the $300^{th}$ ms, and a V2X message may be generated at the $0^{th}$ ms, the $100^{th}$ ms, the $200^{th}$ ms, or the $300^{th}$ ms. In this case, a sending moment of the first V2X message exactly overlaps a DRX wake-up moment (0 ms), the second V2X message can be sent only after 20 ms (120 ms−100 ms), the third V2X message can be sent only after 10 ms (210 ms−200 ms), and a moment of the fourth message exactly overlaps a DRX wake-up moment (the $300^{th}$ ms). Subsequently, messages are cyclically sent by a least common multiple of 300 ms. Therefore, in a worst case, the V2X message is sent after 20 ms. Because the service requirement is that the delay does not exceed 50 ms, a time period of 30 ms (the delay is 50 ms minus the waiting time 20 ms) can still be obtained to transmit the V2X message, so that the V2X message can be easily sent to the second terminal device within 50 ms based on the service requirement.

In a possible implementation, when the service requirement of the first V2X service includes QoS parameters of a plurality of PC5 QoS flows for transmitting the first V2X service, the first DRX parameter determined by the first terminal device may include a DRX parameter corresponding to each PC5 QoS flow for transmitting the first V2X service.

For example, a PC5 QoS flow for transmitting the first V2X service is the first PC5 QoS flow and the second PC5 QoS flow. If a delay included in the QoS parameter of the first PC5 QoS flow does not exceed 80 ms and the message pattern of the first V2X service is the sending period of 100 ms, the first terminal device may determine the DRX parameter corresponding to the first PC5 QoS flow as 70 ms, 60 ms, or the like. If a delay included in the QoS parameter of the second PC5 QoS flow does not exceed 50 ms and the message pattern of the first V2X service is the sending period of 100 ms, the first terminal device may determine that the DRX parameter corresponding to the second PC5 QoS flow is 40 ms, 30 ms, or the like.

In a possible implementation, when an application layer of the first terminal device triggers the first V2X service, for example, when a V2X message that needs to be sent for the first V2X service is generated, a V2X layer of the first terminal device may obtain the transmission requirement (the service requirement and/or the message pattern) of the first V2X service, and send the transmission requirement to an access stratum (AS) of the first terminal device. The access stratum of the first terminal device determines the first DRX parameter based on the transmission requirement of the first V2X service. In a possible implementation, further, the V2X layer of the first terminal device may send DRX indication information to the access stratum of the first terminal device, to indicate the access stratum of the first terminal device to obtain the DRX parameter for the first terminal device. For a process in which the first terminal device obtains the first DRX parameter corresponding to the first V2X service, refer to the foregoing implementation. Repeated parts are not described again.

In an example, that the V2X layer of the first terminal device obtains the service requirement of the first V2X service (for example, the QoS parameter of the PC5 QoS flow for transmitting the first V2X service) includes:

A mapping relationship between the following policy/parameter information may be configured on the first terminal device: a V2X service type (for example, a provider service identifier (PSID) or an application identifier (ITS-AID)) and/or a V2X application requirement (for example, a priority requirement, a reliability requirement, a delay requirement, or a range requirement) of the V2X service type, and a PC5 QoS parameter (namely, a 5G QoS identifier (PC5 5QI), PQI) and/or another parameter (for example, a maximum flow bit rate (MFBR)/(GFBR)). The terminal device may obtain a corresponding PC5 QoS parameter based on a service type of a V2X service triggered by the application layer and/or the V2X application requirement of the V2X service type, and the foregoing mapping relationship stored on the terminal device.

In addition, when determining the first DRX parameter of the first V2X service, the first terminal device may further determine the first DRX parameter based on the transmission requirement of the first V2X service and a transmission requirement (the transmission requirement may be a service requirement and/or a message pattern, or may be a specific DRX parameter) of one or more third V2X services that are being performed by the first terminal device. The third V2X service that is being performed by the first terminal device may be one or more of a V2X service in unicast PC5 communication between the first terminal device and another terminal device (which is not the second terminal device), a V2X service in multicast PC5 communication that is being performed by the first terminal device, and a V2X service in broadcast PC5 communication that is being performed by the first terminal device.

S302. The first terminal device sends the first DRX parameter to the second terminal device, and the second terminal device receives the first DRX parameter.

The first DRX parameter is used by the first terminal device and the second terminal device to perform PC5 communication of the first V2X service.

The first terminal device may include the first DRX parameter in the first message, and send the first DRX parameter to the second terminal device by sending the first message carrying the first DRX parameter to the second terminal device. For example, the first message may be a direct communication request message, a link modification request message, or a message dedicated for negotiating a PC5 DRX parameter, for example, a PC5 DRX negotiation request message.

For example, if no unicast connection is established between the first terminal device and the second terminal device, the first terminal device and the second terminal device establish a unicast connection. In this case, the first terminal device may send a direct communication request message carrying the first DRX parameter to the second terminal device, to send the first DRX parameter to the second terminal device. If a unicast connection is established between the first terminal device and the second terminal device, the first terminal device may send the first DRX parameter to the second terminal device by sending a link modification request message carrying the first DRX parameter to the second terminal device.

In a possible implementation, the first message sent by the first terminal device to the second terminal device may further carry the transmission requirement of the first V2X service or identification information of the first V2X service, so that the second terminal device learns of the transmission requirement of the first V2X service, to determine a DRX parameter for performing PC5 communication of the first V2X service with the first terminal device.

S303A. The second terminal device sends an acknowledgment message to the first terminal device, and the first terminal device receives the acknowledgment message, where the acknowledgment message indicates that the second terminal device accepts the first DRX parameter.

S303B. The second terminal device sends a second message to the first terminal device, and the first terminal device receives the second message, where the second message includes a second DRX parameter.

The second DRX parameter is used by the first terminal device and the second terminal device to perform PC5 communication of the first V2X service.

It should be understood that S303A and S303B are mutually exclusive. To be specific, if S303A is performed, S303B is not performed; if S303B is performed, S303A is not performed.

After the second terminal device receives the first DRX parameter sent by the first terminal device, the second terminal device may directly accept the first DRX parameter provided by the first terminal device, and perform PC5 communication of the first V2X service with the first terminal device based on the first DRX parameter provided by the first terminal device. In this case, the second terminal device returns (or sends) the acknowledgment message to the first terminal device, to indicate that the second terminal device accepts the first DRX parameter, that is, performs S303A.

In a possible implementation, after the second terminal device receives the first DRX parameter sent by the first terminal device, the second terminal device may further adjust the first DRX parameter based on a status of the second terminal device, for example, a transmission requirement (the transmission requirement may be a service requirement and/or a message pattern, or may be a specific DRX parameter) of one or more fourth V2X services being performed by the second terminal device, and re-determine a new second DRX parameter, that is, perform S303B.

In another possible implementation, after the second terminal device receives the first DRX parameter sent by the first terminal device, the second terminal device may further generate a second DRX parameter. The first DRX parameter and the second DRX parameter are applicable to the first terminal device and the second terminal device respectively. To be specific, the first terminal device wakes up based on the first DRX parameter to receive data, and the second terminal device wakes up based on the second DRX parameter to receive data, that is, performs S303B.

The second DRX parameter may be generated by the second terminal device based on the status of the second terminal device, for example, the transmission requirement of the one or more fourth V2X services being performed by the second terminal device, or may be generated based on the status of the second terminal device and the first DRX parameter and/or the transmission requirement of the first V2X service. For the transmission requirement of the first V2X service, the first terminal device may include the transmission requirement of the first V2X service in the first message, and send the first message to the second terminal device together with the first DRX parameter. Alternatively, the first message may carry the identification information of the first V2X service, and the second terminal device searches, based on the identification information of the first V2X service, a transmission requirement of each V2X service stored on the second terminal device for the transmission requirement of the first V2X service, or learns of the transmission requirement of the first V2X service by interacting with another device (for example, a network device).

In addition, when S303B is performed, for whether the first terminal device and the second terminal device perform PC5 communication of the first V2X service based on the second DRX parameter or based on the first DRX parameter and the second DRX parameter, the second terminal device may notify the first terminal device by using another message, may include indication information in the second message to indicate the first terminal device, or may negotiate with the first terminal device in advance. This is not limited in this embodiment of this application.

The fourth V2X service that is being performed by the second terminal device may be one or more of a V2X service in unicast PC5 communication between the second terminal device and another terminal device (which is not the first terminal device), a V2X service in multicast PC5 communication that is being performed by the second terminal device, and a V2X service in broadcast PC5 communication that is being performed by the second terminal device.

In an example, a sixth DRX parameter "25 ms" is for PC5 communication between the second terminal device and a third terminal device for the V2X service. After the second terminal device receives the first DRX parameter "30 ms" that is sent by the first terminal device and that is for performing PC5 communication of the first V2X service, because 25 ms<30 ms, the second terminal device may determine that the second DRX parameter for performing PC5 communication of the first V2X service with the first terminal device is 25 ms, which is the same as the sixth DRX parameter. In this case, the second terminal device may perform PC5 communication of the V2X service with both the first terminal device and the third terminal device based on a same DRX parameter, so that power saving can be better implemented.

In another possible implementation, if the first message carrying the first DRX parameter further carries the transmission requirement of the first V2X service, when determining the second DRX parameter for performing PC5 communication of the first V2X service with the first terminal device, the second terminal device may further determine the second DRX parameter based on the transmission requirement of the first V2X service and a transmission requirement of one or more fourth V2X services being performed by the second terminal device. For example, a sixth DRX parameter "25 ms" is for PC5 communication between the second terminal device and a third terminal device for the V2X service. After receiving the first DRX parameter "30 ms" that is sent by the first terminal device and that is for performing PC5 communication of the first V2X service, the message pattern "100 ms" of the first V2X service, and the service requirement "50 ms" of the first V2X service, the second terminal device determines that 25 ms<30 ms<50 ms<100 ms, and the second terminal device may determine that the second DRX parameter is 25 ms.

For example, if no unicast connection is established between the first terminal device and the second terminal device, the second terminal device may indicate, by using a direct communication response message, the second terminal device to accept the first DRX parameter provided by the first terminal device, or include the second DRX parameter in the direct communication response message and indicate the first terminal device to use the second DRX parameter or newly add a second DRX parameter applicable to the second terminal device, to perform PC5 communication of the first V2X service with the second terminal device. That is, in this embodiment of this application, the second message and the acknowledgment message may be direct communication response messages.

If a unicast connection is established between the first terminal device and the second terminal device, the second terminal device may indicate, by using a link modification response message, the second terminal device to accept the first DRX parameter provided by the first terminal device, or include the second DRX parameter in the link modification response message and indicate the first terminal device to use the second DRX parameter or newly add a second DRX parameter applicable to the second terminal device, to perform PC5 communication of the first V2X service with the second terminal device. That is, in this embodiment of this application, the second message and the acknowledgment message may alternatively be link modification response messages.

S304. The first terminal device and the second terminal device perform PC5 communication of the first V2X service based on the first DRX parameter and/or the second DRX parameter.

Case 1: If the second terminal device accepts the first DRX parameter sent by the first terminal device, the first terminal device and the second terminal device perform PC5 communication of the first V2X service based on the first DRX parameter.

In a scenario in which the first V2X service is unidirectionally transmitted from the second terminal device to the first terminal device, the second terminal device sends data of the first V2X service to the first terminal device based on the first DRX parameter, and the first terminal device receives, based on the first DRX parameter, the data of the first V2X service sent by the second terminal device. In a scenario in which the first V2X service is bidirectionally transmitted by the second terminal device and the first terminal device, the second terminal device sends data of the first V2X service to the first terminal device based on the first DRX parameter, and receives, based on the first DRX parameter, data of the first V2X service sent by the first terminal device. Similarly, the first terminal device receives, based on the first DRX parameter, the data of the first V2X service sent by the second terminal device, and sends the data of the first V2X service to the second terminal device based on the first DRX parameter.

Case 2: If the second terminal device re-determines a new second DRX parameter for performing PC5 communication of the first V2X service with the first terminal device, the first terminal device and the second terminal device perform PC5 communication of the first V2X service based on the second DRX parameter.

In a scenario in which the first V2X service is unidirectionally transmitted from the second terminal device to the first terminal device, the second terminal device sends data of the first V2X service to the first terminal device based on the second DRX parameter, and the first terminal device receives, based on the second DRX parameter, the data of the first V2X service sent by the second terminal device. In a scenario in which the first V2X service is bidirectionally transmitted by the second terminal device and the first terminal device, the second terminal device sends data of the first V2X service to the first terminal device based on the second DRX parameter, and receives, based on the second DRX parameter, data of the first V2X service sent by the first terminal device. Similarly, the first terminal device receives, based on the second DRX parameter, the data of the first V2X service sent by the second terminal device, and sends the data of the first V2X service to the second terminal device based on the second DRX parameter.

Case 3: After the second terminal device receives the first DRX parameter sent by the first terminal device, if the second terminal device re-generates a second DRX parameter, the first terminal device and the second terminal device perform PC5 communication of the first V2X service based on the second DRX parameter and the first DRX parameter.

In this case, the first terminal device and the second terminal device each have a DRX parameter for waking up to receive data, and the first terminal device and the second terminal device may perform bidirectional transmission. The second terminal device receives, based on the second DRX parameter, data of the first V2X service sent by the first terminal device, and sends data of the first V2X service to the first terminal device based on the first DRX parameter. The first terminal device receives, based on the first DRX parameter, data of the first V2X service sent by the second terminal device, and sends data of the first V2X service to the second terminal device based on the second DRX parameter.

It should be understood that when the first DRX parameter includes the DRX parameter corresponding to the at least one PC5 QoS flow that is for transmitting the first V2X service and that is between the first terminal device and the second terminal device, for example, the first DRX parameter includes the DRX parameter corresponding to the first PC5 QoS flow and the DRX parameter corresponding to the second PC5 QoS flow, for the case 1, the first terminal device and the second terminal device perform PC5 communication of the first PC5 QoS flow based on the DRX parameter corresponding to the first PC5 QoS flow, and the first terminal device and the second terminal device perform PC5 communication of the second PC5 QoS flow based on the DRX parameter corresponding to the second PC5 QoS flow.

For the case 2, the second DRX parameter provided by the second terminal device includes a DRX parameter corresponding to the first PC5 QoS flow and a DRX parameter corresponding to the second PC5 QoS flow that are newly determined by the second terminal device. In this case, the first terminal device and the second terminal device perform PC5 communication of the first PC5 QoS flow and the second PC5 QoS flow based on the DRX parameter corresponding to the first PC5 QoS flow and the DRX parameter corresponding to the second PC5 QoS flow that are newly determined by the second terminal device.

For the case 3, the second DRX parameter provided by the second terminal device includes the DRX parameter corresponding to the first PC5 QoS flow and the DRX parameter corresponding to the second PC5 QoS flow that are applicable to the second terminal device. In this case, the first terminal device receives, based on the DRX parameter corresponding to the first PC5 QoS flow and the DRX parameter corresponding to the second PC5 QoS flow that are included in the first DRX parameter, data sent by the second terminal device, and sends data to the second terminal device based on the DRX parameter corresponding to the first PC5 QoS flow and the DRX parameter corresponding to the second PC5 QoS flow that are included in the second DRX parameter; and the second terminal device sends data to the second terminal device based on the DRX parameter corresponding to the first PC5 QoS flow and the DRX parameter corresponding to the second PC5 QoS flow that are included in the first DRX parameter, and receives, based on the DRX parameter corresponding to the first PC5 QoS flow and the DRX parameter corresponding to the second PC5 QoS flow that are included in the second DRX parameter.

In addition, optionally, when the PC5 communication performed by the first terminal device and the second terminal device for the first V2X service belongs to a PC5 communication mode (for example, a mode 1 or a mode 3) in which a network device schedules a PC5 communication resource for the PC5 communication performed by a terminal device, the first terminal device may further send, to the network device, the first DRX parameter accepted by the second terminal device (the case 1), send, to the network device, the second DRX parameter re-determined by the second terminal device (the case 2), or send the first DRX parameter applicable to the first terminal device and the second DRX parameter applicable to the second network device to the network device (the case 3). For example, the parameter or the parameters is/are sent to the network device by using a radio resource control (RRC) message, so that the network device schedules a PC5 communication resource for the first V2X service of the first terminal device and the second terminal device based on the DRX parameter for performing PC5 communication of the first V2X service by the first terminal device and the second terminal device.

After determining the first DRX parameter and/or the second DRX parameter for performing PC5 communication of the first V2X service, the first terminal device and the second terminal device may periodically wake up, based on the first DRX parameter and/or the second DRX parameter, from a sleep state to listen to to-be-received data on a PC5 interface when listening is required, and enter the sleep state when listening is not required, to reduce energy consumption.

Solution 2

Figure 4:
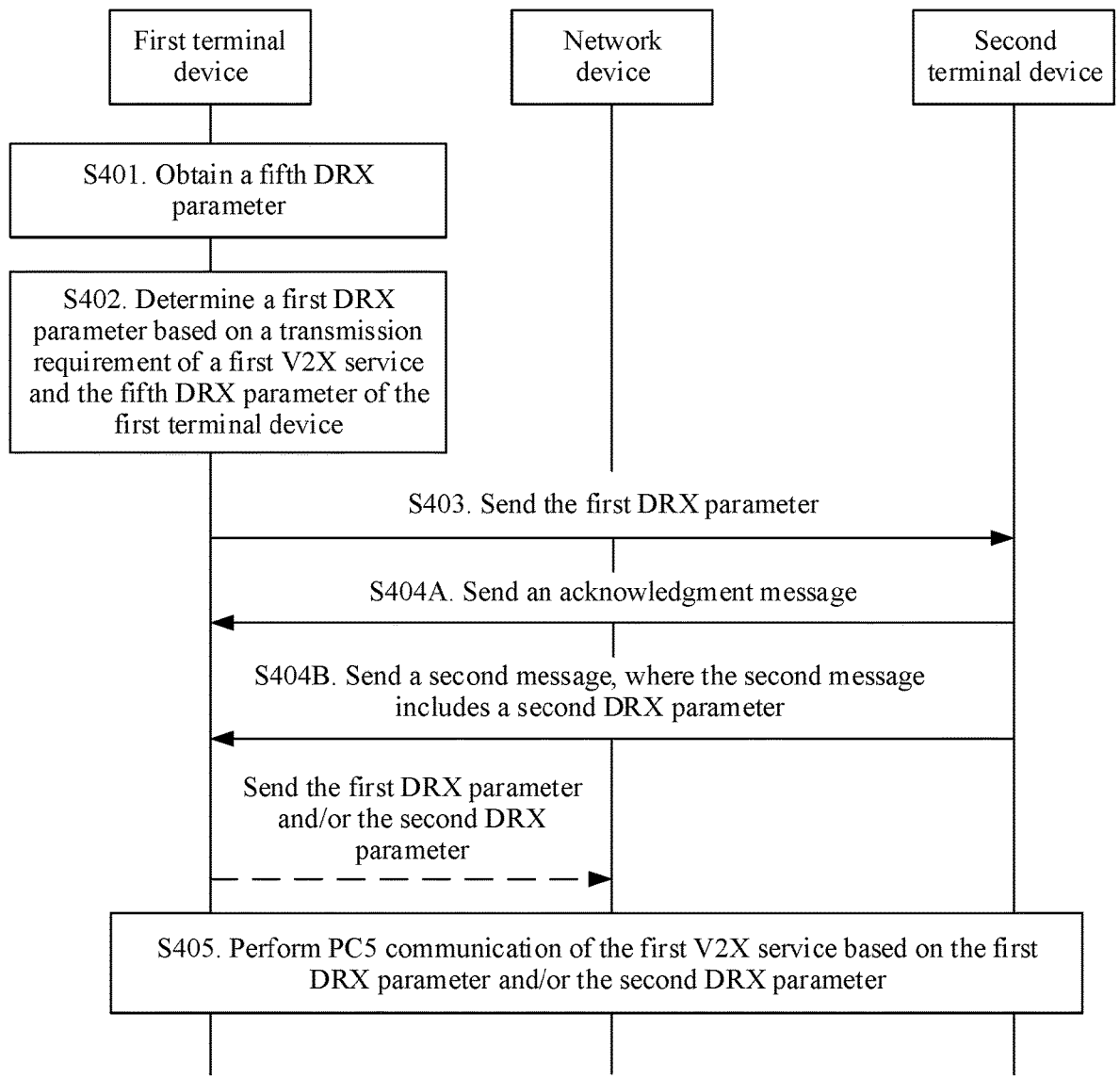
FIG. 4 is a schematic flowchart 2 of a communication method according to an embodiment of this application.

FIG. 4 is a schematic flowchart of another communication method according to an embodiment of this application. The method includes the following steps.

S401. For a PC5 communication mode in which a network device schedules a PC5 resource, a first terminal device receives a fifth DRX parameter of the first terminal device from the network device; or for a PC5 communication mode in which a non-network device schedules a PC5 resource, a first terminal device locally configures a fifth DRX parameter.

S402. The first terminal device determines a first DRX parameter based on a transmission requirement of a first V2X service and the fifth DRX parameter of the first terminal device.

The transmission requirement includes a service requirement and/or a message pattern.

S403. The first terminal device sends the first DRX parameter to the second terminal device, and the second terminal device receives the first DRX parameter.

S404A. The second terminal device sends an acknowledgment message to the first terminal device, and the first terminal device receives the acknowledgment message, where the acknowledgment message indicates that the second terminal device accepts the first DRX parameter.

S404B. The second terminal device sends a second message to the first terminal device, and the first terminal device receives the second message, where the second message includes a second DRX parameter.

The second DRX parameter is used by the first terminal device and the second terminal device to perform PC5 communication of the first V2X service.

It should be understood that S404A and S404B are mutually exclusive. To be specific, if S404A is performed, S404B is not performed; if S404B is performed, S404A is not performed.

S405. The first terminal device and the second terminal device perform PC5 communication of the first V2X service based on the first DRX parameter and/or the second DRX parameter.

In Solution 2, the network device may indicate a basic DRX parameter, namely, the fifth DRX parameter, to the first terminal device by using an RRC message or the like, and may schedule a PC5 communication resource for the first terminal device based on the fifth DRX parameter. The first terminal device needs to perform PC5 communication of a V2X service with the second terminal device based on the PC5 communication resource scheduled by the network device. Therefore, when determining a DRX parameter corresponding to the V2X service, the first terminal device and the second terminal device need to consider the fifth DRX parameter, to obtain the corresponding PC5 communication resource.

Alternatively, the first terminal device may locally configure a basic DRX parameter, that is, the fifth DRX parameter, and may preempt a PC5 communication resource for the first terminal device based on the fifth DRX parameter. The first terminal device needs to perform PC5 communication of a V2X service with the second terminal device based on the preempted PC5 communication resource. Therefore, when determining a DRX parameter corresponding to the V2X service, the first terminal device and the second terminal device need to consider the fifth DRX parameter, to obtain the corresponding PC5 communication resource.

In Solution 2, a manner in which the first terminal device determines the first DRX parameter and a manner in which the second terminal device determines the second DRX parameter are similar to those in Solution 1. A difference lies in that the fifth DRX parameter further needs to be considered when the first terminal device determines the first DRX parameter and the second terminal device determines the second DRX parameter. In a possible implementation, the first DRX parameter and the second DRX parameter are an integer multiple of the fifth DRX parameter. Specifically, for the manner in which the first terminal device determines the first DRX parameter, a procedure in which the second terminal device determines the second DRX parameter, and a procedure of performing PC5 communication of the first V2X service based on the determined first DRX parameter and/or the determined second DRX, refer to the implementations in Solution 1. Repeated parts are not described again.

In addition, optionally, to facilitate learning of the fifth DRX parameter by the second terminal device, a first message that is sent by the first terminal device to the second terminal device and that carries the first DRX parameter may further carry the fifth DRX parameter.

In addition, for the PC5 communication mode in which the network device schedules the PC5 resource, because the first DRX parameter and/or the second DRX parameter for performing the first V2X service are/is determined based on the fifth DRX parameter indicated by the network device to the first terminal device in Solution 2, the first terminal device may not report the first DRX parameter and/or the second DRX parameter for performing the first V2X service to the network device.

Regardless of Solution 1 or Solution 2, when a second V2X service is newly added for the first terminal device and the second terminal device, the first terminal device needs to obtain a transmission requirement of the second V2X service, and determines whether the currently used first DRX parameter and/or second DRX parameter can meet the transmission requirement of the second V2X service. If the first DRX parameter and/or the second DRX parameter currently used by the first terminal device and the second terminal device cannot meet the transmission requirement of the newly added second V2X service, DRX parameter update needs to be initiated. In this embodiment of this application, a DRX parameter is updated in two manners. Manner 1: A DRX parameter corresponding to the first V2X service is updated, and PC5 communication of the first V2X service and the second V2X service of the first terminal device and the second terminal device is performed based on an updated DRX parameter. Manner 2: A DRX parameter of the second V2X service is newly added, and PC5 communication of the newly added second V2X service is performed based on the newly added DRX parameter. The following provides descriptions separately.

Manner 1: A DRX parameter corresponding to the first V2X service is updated, and PC5 communication of the first V2X service and the second V2X service of the first terminal device and the second terminal device is performed based on an updated DRX parameter (that is, the DRX parameter is a DRX parameter at a PC5 unicast granularity, and a plurality of V2X services correspond to a same DRX parameter).

Figure 5:
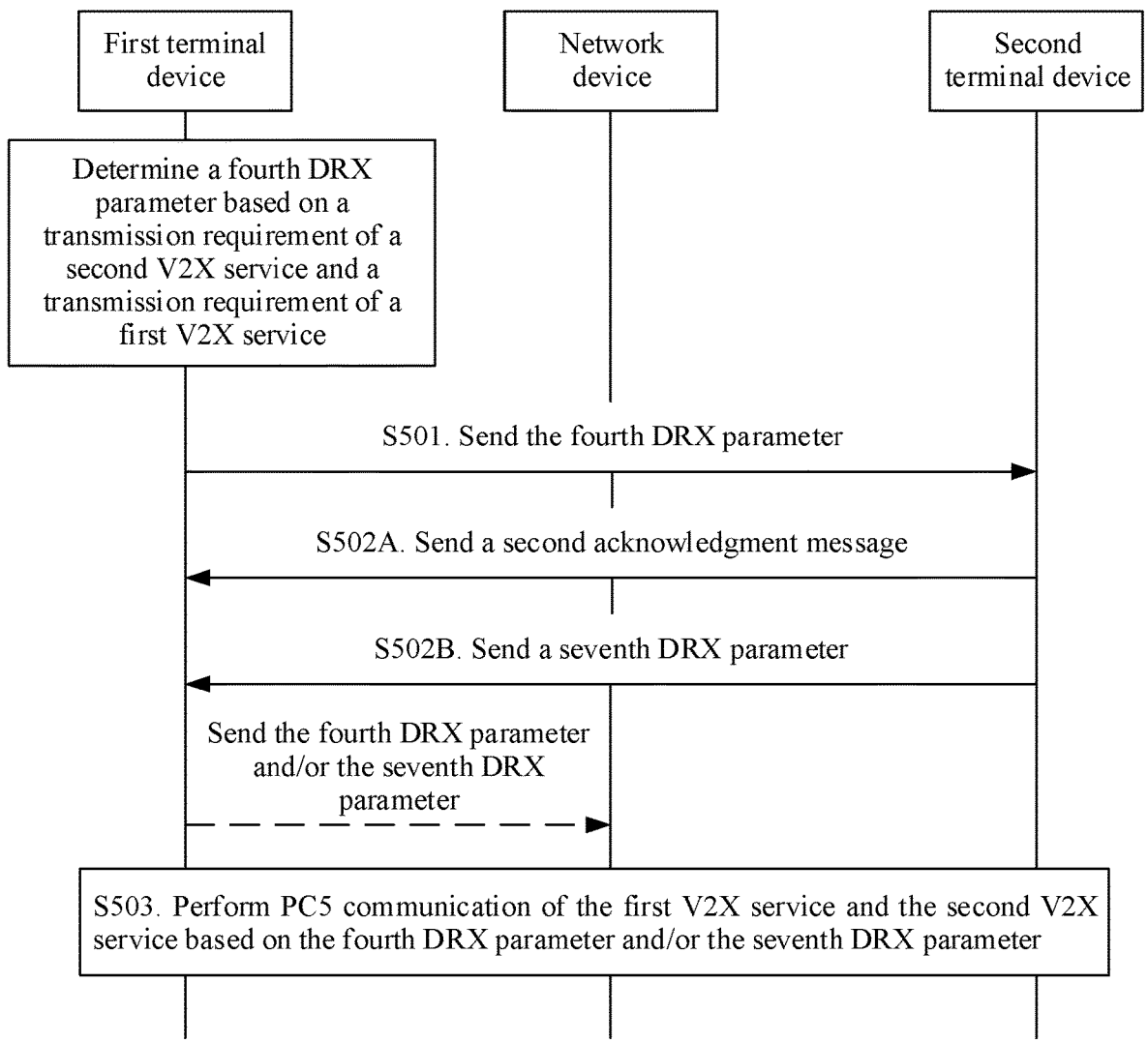
FIG. 5 is a schematic flowchart 3 of a communication method according to an embodiment of this application.

Refer to a schematic flowchart of a communication method shown in FIG. 5, the method includes the following steps.

S501. A first terminal device sends a fourth DRX parameter to a second terminal device based on a transmission requirement of a second V2X service and a transmission requirement of a first V2X service, and the second terminal device receives the fourth DRX parameter.

The fourth DRX parameter is used by the first terminal device and the second terminal device to perform PC5 communication of the first V2X service and the second V2X service.

Specifically, the fourth DRX parameter needs to meet the transmission requirement of the second V2X service and the transmission requirement of the first V2X service. When a network device indicates a fifth DRX parameter to the first terminal device or the first terminal device locally configures a fifth DRX parameter, the fifth DRX parameter further needs to be considered. For example, the fourth DRX parameter needs to be an integer multiple of the fifth DRX parameter. For determining of the fourth DRX parameter, refer to the foregoing procedure of determining the first DRX parameter. Repeated parts are not described again.

In an example, when the first terminal device and the second terminal device perform PC5 communication of the first V2X service, a unicast connection has been established. The first terminal device may send the fourth DRX parameter to the second terminal device by sending a link modification request message carrying the fourth DRX parameter to the second terminal device. In a possible implementation, the first terminal device may further send the transmission requirement of the second V2X service to the second terminal device, for example, include the transmission requirement of the second V2X service to the link modification request message that is for sending the fourth DRX parameter, so that the second terminal device determines a DRX parameter for performing PC5 communication of the first V2X service and the second V2X service with the first terminal device.

S502A. The second terminal device sends a second acknowledgment message to the first terminal device, and the first terminal device receives the second acknowledgment message, where the second acknowledgment message indicates that the second terminal device accepts the fourth DRX parameter.

S502B. The second terminal device sends a seventh DRX parameter to the first terminal device, and the first terminal device receives the seventh DRX parameter.

The seventh DRX parameter is used by the first terminal device and the second terminal device to perform PC5 communication of the first V2X service and the second V2X service.

It should be understood that S502A and S502B are mutually exclusive. To be specific, if S502A is performed, S502B is not performed; if S502B is performed, S502A is not performed.

If the second terminal device accepts the fourth DRX parameter provided by the first terminal device, the second terminal device may return the second acknowledgment message to the first terminal device, to indicate that the second terminal device accepts the fourth DRX parameter.

In a possible implementation, after the second terminal device receives the fourth DRX parameter sent by the first terminal device, the second terminal device may further adjust the fourth DRX parameter based on a status of the second terminal device, for example, a transmission requirement (the transmission requirement may be a service requirement and/or a message pattern, or may be a specific DRX parameter) of one or more fourth V2X services being performed by the second terminal device, and re-determine a new seventh DRX parameter; or re-determine a seventh DRX parameter based on the fourth DRX parameter.

For a procedure of determining the seventh DRX parameter by the second terminal device, refer to the foregoing procedure of determining the second DRX parameter by the second terminal device. Repeated parts are not described again.

In addition, it should be understood that, when the network device indicates the fifth DRX parameter to the first terminal device or the first terminal device locally configures the fifth DRX parameter, when determining the seventh DRX parameter, the second terminal device further needs to consider the fifth DRX parameter. For example, the seventh DRX parameter needs to be an integer multiple of the fifth DRX parameter.

S503. The first terminal device and the second terminal device perform PC5 communication of the first V2X service and the second V2X service based on the fourth DRX parameter and/or the seventh DRX parameter.

In the manner 1, the first terminal device and the second terminal device perform PC5 communication of the first V2X service and the second V2X service based on the newly determined fourth DRX parameter and/or the newly determined seventh DRX parameter. In other words, a same DRX parameter is used for a plurality of V2X services between the first terminal device and the second terminal device, and the DRX parameter is a DRX parameter at a PC5 unicast granularity.

Manner 2: A DRX parameter of the second V2X service is newly added, and PC5 communication of the newly added second V2X service is performed based on the newly added DRX parameter (a DRX parameter at a V2X service granularity, that is, each V2X service may correspond to a different DRX parameter).

Figure 6:
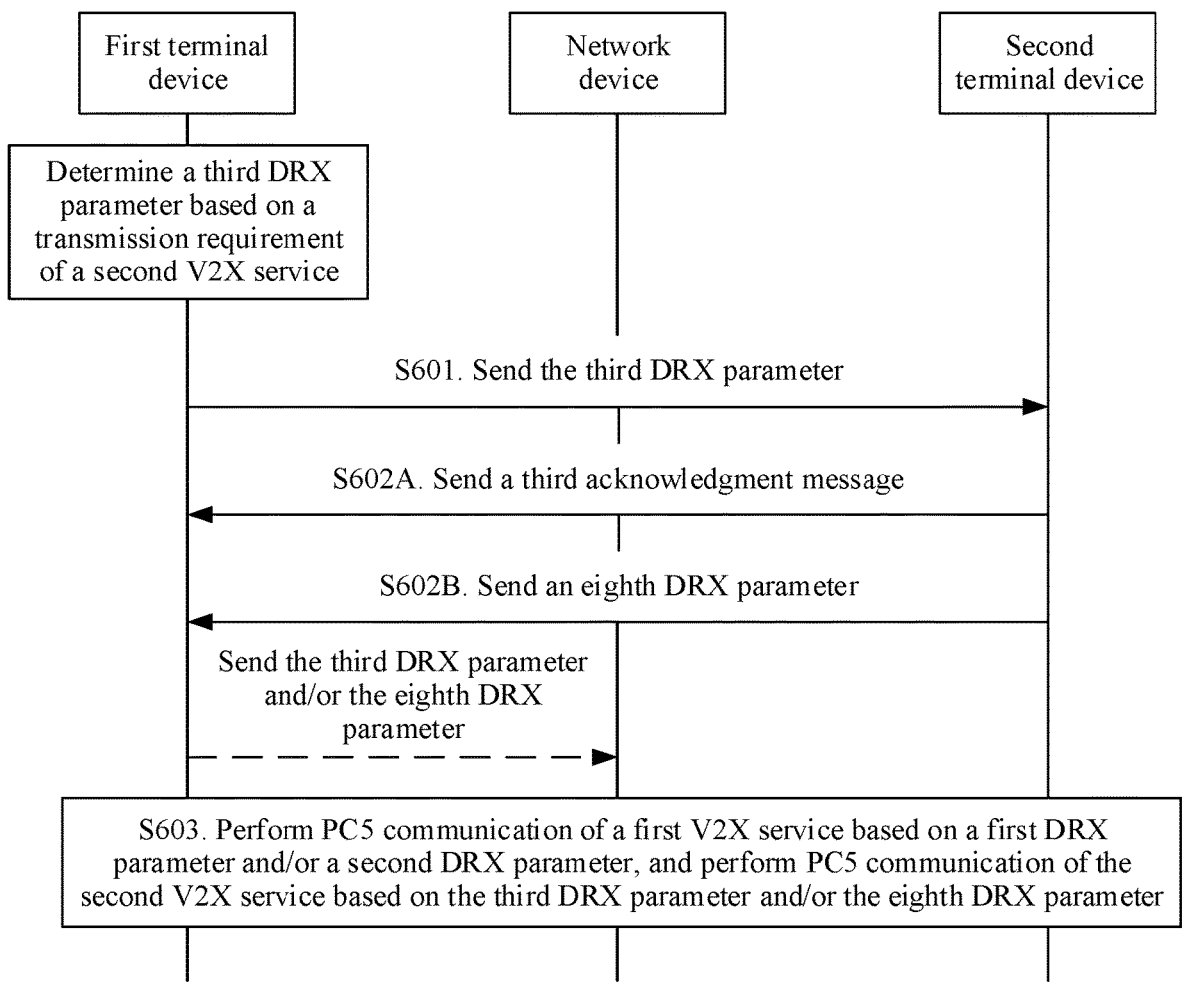
FIG. 6 is a schematic flowchart 4 of a communication method according to an embodiment of this application.

Refer to a schematic flowchart of a communication method shown in FIG. 6, the method includes the following steps.

S601. A first terminal device sends a third DRX parameter to a second terminal device based on a transmission requirement of a second V2X service, and the second terminal device receives the third DRX parameter.

The third DRX parameter is used by the first terminal device and the second terminal device to perform PC5 communication of the second V2X service.

S602A. The second terminal device sends a third acknowledgment message to the first terminal device, and the first terminal device receives the third acknowledgment message, where the third acknowledgment message indicates that the second terminal device accepts the third DRX parameter.

S602B. The second terminal device sends an eighth DRX parameter to the first terminal device, and the first terminal device receives the eighth DRX parameter.

The eighth DRX parameter is used by the first terminal device and the second terminal device to perform PC5 communication of the second V2X service.

It should be understood that S602A and S602B are mutually exclusive. To be specific, if S602A is performed, S602B is not performed; if S602B is performed, S602A is not performed.

S603. The first terminal device and the second terminal device perform PC5 communication of a first V2X service based on a first DRX parameter and/or a second DRX parameter; and perform PC5 communication of the second V2X service based on the third DRX parameter and/or the eighth DRX parameter.

Specifically, when the second V2X service is newly added, for a procedure in which the first terminal device and the second terminal device negotiate a DRX parameter (the third DRX parameter and/or the eighth DRX parameter) corresponding to the second V2X service, refer to the foregoing procedure of determining the DRX parameter (the first DRX parameter and/or the second DRX parameter) corresponding to the first V2X service. Repeated parts are not described again. In addition, it should be understood that, when a network device indicates a fifth DRX parameter to the first terminal device or the first terminal device locally configures a fifth DRX parameter, the fifth DRX parameter further needs to be considered. For example, the third DRX parameter determined for the first terminal device or the eighth DRX parameter determined by the second terminal device needs to be an integer multiple of the fifth DRX parameter.

Different from the manner 1, when the second V2X service is newly added, if an existing DRX parameter cannot meet the transmission requirement of the second V2X service, the first terminal device and the second terminal device renegotiate a DRX parameter, to perform PC5 communication of the newly added second V2X service. A different DRX parameter may be used for each V2X service between the first terminal device and the second terminal device, and the DRX parameter may be at a V2X service granularity.

In addition, it should be understood that, in this embodiment of this application, the DRX parameter for performing PC5 communication of the V2X service may be negotiated and determined by V2X layers of the first terminal device and the second terminal device, or may be negotiated and determined by access stratums of the first terminal device and the second terminal device. When Solution 1 is used, if the V2X layers of the first terminal device and the second terminal device perform negotiation and determining, the determined DRX parameter needs to be indicated to the access stratum of the first terminal device, so that the first terminal device wakes up in a DRX period to request a PC5 communication resource from the network device or locally preempts a PC5 communication resource. In a case of the mode in which the network device schedules a PC5 communication resource, the access stratum of the first terminal device further needs to report the PC5 communication resource to the network device, so that the network device schedules the PC5 communication resource for the first terminal device. When Solution 2 is used, if the V2X layers of the first terminal device and the second terminal device perform negotiation and determining, after the access stratum of the first terminal device obtains a basic DRX parameter (for example, the fifth DRX parameter) indicated by the network device or the first terminal device locally configures the fifth DRX parameter, the access stratum of the first terminal device needs to report the basic DRX parameter to the V2X layer of the first terminal device, to negotiate, based on the basic DRX parameter, a DRX parameter for performing PC5 communication of the V2X service with the second terminal device.

In addition, if the DRX parameter for performing PC5 communication of the V2X service is negotiated and determined by the V2X layer of the first terminal device and the V2X layer of the second terminal device, the second terminal device further needs to send the determined DRX parameter to the access stratum of the second terminal device, so that the second terminal device wakes up in a DRX period and listens to to-be-received data of the V2X service on a PC5 interface, to achieve an energy saving effect.

The foregoing is mainly described from a perspective of unicast PC5 communication of a V2X service between the first terminal device and the second terminal device. For multicast PC5 communication or broadcast PC5 communication of a V2X service performed by the first terminal device, after the first terminal device determines a DRX parameter of the V2X service, and sends the DRX parameter to one or more second terminal devices in multicast or broadcast mode, the one or more second terminal devices may directly perform PC5 communication of the V2X service with the first terminal device based on the DRX parameter sent by the first terminal device.

In an example, after the first terminal device determines the first DRX parameter of the first V2X service (a multicast or broadcast service), and sends the first DRX parameter to one or more second terminal devices by using a broadcast or multicast message, the one or more second terminal devices may send data of the first V2X service to the first terminal device based on the first DRX parameter, and the first terminal device may receive, based on the first DRX parameter, the data of the first V2X service sent by the one or more second terminal devices. For determining of the first DRX parameter of the first V2X service, refer to the implementation in Solution 1 or Solution 2. Repeated parts are not described again.

In another example, when the first terminal device is performing one or more V2X services, the first terminal device may further determine, as the first DRX parameter of the first V2X service based on a transmission requirement of the one or more ongoing V2X services (including a unicast V2X service, a multicast V2X service, and a broadcast V2X service) and the transmission requirement of the first V2X service (a multicast or broadcast service), a DRX parameter that meets the transmission requirement of the one or more V2X services and the transmission requirement of the first V2X service, and send the first DRX parameter to one or more second terminal devices through multicast or broadcast. The one or more second terminal devices may send data of the first V2X service to the first terminal device based on the first DRX parameter. The first terminal device may receive, based on the first DRX parameter, the data of the first V2X service sent by the one or more second terminal devices.

In another possible implementation, that the first terminal device performs multicast PC5 communication or broadcast PC5 communication of the V2X service includes sending and/or receiving a multicast PC5 communication service or a broadcast PC5 communication service. For determining a DRX parameter of a V2X service by the first terminal device and determining a DRX parameter of a V2X service by another terminal device that needs to perform multicast PC5 communication or broadcast PC5 communication of the V2X service, all terminal devices may use a same DRX parameter generation policy, to generate a DRX parameter for a specific V2X service. Because transmission requirements of the specific V2X service of all terminal devices are the same, DRX parameters generated by the terminal devices for the specific V2X service are also the same. Therefore, the first terminal device may not need to send the DRX parameter of the first terminal device to another terminal device through multicast or broadcast. To be specific, the first terminal device may directly perform PC5 communication of the V2X service with another terminal device based on the DRX parameter generated by the first terminal device, including sending and/or receiving a multicast PC5 communication service or a broadcast PC5 communication service for the V2X service in which the first terminal device is interested.

The foregoing describes, mainly from a perspective of interaction between the first terminal device and the second terminal device, solutions provided in this application. It may be understood that, to implement the foregoing functions, each network element includes a corresponding hardware structure and/or software module (or unit) for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
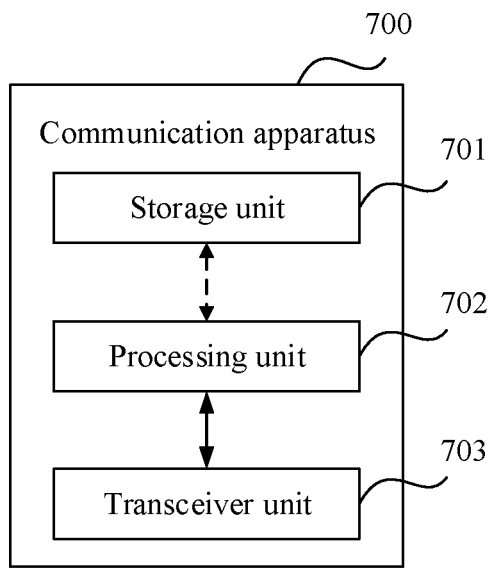
FIG. 7 is a schematic diagram 1 of a communication apparatus according to an embodiment of this application.
Figure 8:
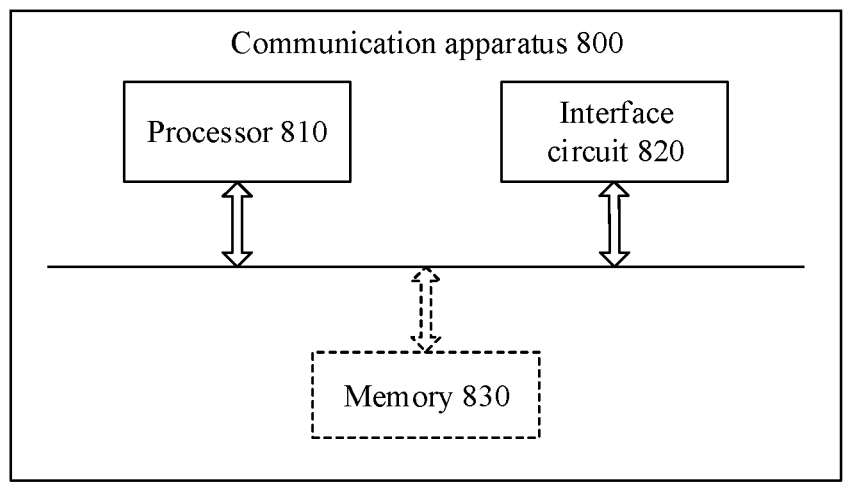
FIG. 8 is a schematic diagram 2 of a communication apparatus according to an embodiment of this application.

FIG. 7 and FIG. 8 are schematic diagrams of structures of possible communication apparatuses according to embodiments of this application. The communication apparatuses may be configured to implement functions of the first terminal device or the second terminal device in the foregoing method embodiments, and therefore can also achieve advantageous effects of the foregoing method embodiments. In an embodiment of this application, the communication apparatus may be the first terminal device in FIG. 3, FIG. 4, FIG. 5, or FIG. 6, be the second terminal device in FIG. 3, FIG. 4, FIG. 5, or FIG. 6, or may be a module (for example, a chip) used in the first terminal device or the second terminal device.

As shown in FIG. 7, a communication apparatus 700 may include a processing unit 702 and a transceiver unit 703, and may further include a storage unit 701. The communication apparatus 700 is configured to implement functions of the first terminal device or the second terminal device in the method embodiment in FIG. 3, FIG. 4, FIG. 5, or FIG. 6.

In a possible design, the processing unit 702 is configured to implement a corresponding processing function. The transceiver unit 703 is configured to support the communication apparatus 700 in communicating with another network entity. The storage unit 701 is configured to store program code and/or data of the communication apparatus 700. Optionally, the transceiver unit 703 may include a receiving unit and/or a sending unit, which are respectively configured to perform a receiving operation and a sending operation.

When the communication apparatus 700 is configured to implement functions of the first terminal device in the method embodiment, the processing unit 702 is configured to determine a first discontinuous reception DRX parameter based on a transmission requirement of a first vehicle-to-everything V2X service, where the transmission requirement includes a service requirement and/or a message pattern. The transceiver unit 703 is configured to send the first DRX parameter to a second terminal device, where the first DRX parameter is used by the communication apparatus 700 and the second terminal device to perform PC5 communication of the first V2X service.

In a possible design, when determining the first DRX parameter based on the transmission requirement of the first V2X service, the processing unit 702 is specifically configured to determine the first DRX parameter based on the transmission requirement of the first V2X service and a transmission requirement of one or more third V2X services, where the one or more third V2X services are a V2X service being performed by the communication apparatus 700.

In a possible design, the first DRX parameter is carried in a first message, and the first message further includes the transmission requirement.

In a possible design, the transceiver unit 703 is further configured to receive an acknowledgment message from the second terminal device, where the acknowledgment message indicates that the second terminal device accepts the first DRX parameter. The transceiver unit 703 is further configured to perform PC5 communication of the first V2X service with the second terminal device based on the first DRX parameter.

In a possible design, when performing PC5 communication of the first V2X service with the second terminal device based on the first DRX parameter, the transceiver unit 703 is specifically configured to: receive, based on the first DRX parameter, data that is of the first V2X service and that is sent by the second terminal device; or receive, based on the first DRX parameter, data that is of the first V2X service and that is sent by the second terminal device, and send data of the first V2X service to the second terminal device based on the first DRX parameter.

In a possible design, the transceiver unit 703 is further configured to receive a second message from the second terminal device, where the second message includes a second DRX parameter, and the second DRX parameter is used by the communication apparatus 700 and the second terminal device to perform PC5 communication of the first V2X service. The transceiver unit 703 is further configured to: perform PC5 communication of the first V2X service with the second terminal device based on the second DRX parameter; or perform PC5 communication of the first V2X service with the second terminal device based on the first DRX parameter and the second DRX parameter.

In a possible design, when performing PC5 communication of the first V2X service with the second terminal device based on the second DRX parameter, the transceiver unit 703 is specifically configured to: receive, based on the second DRX parameter, data that is of the first V2X service and that is sent by the second terminal device; or receive, based on the second DRX parameter, data that is of the first V2X service and that is sent by the second terminal device, and send data of the first V2X service to the second terminal device based on the second DRX parameter.

In a possible design, when performing PC5 communication of the first V2X service with the second terminal device based on the first DRX parameter and the second DRX parameter, the transceiver unit 703 is specifically configured to: receive, based on the first DRX parameter, data that is of the first V2X service and that is sent by the second terminal device, and send data of the first V2X service to the second terminal device based on the second DRX parameter.

In a possible design, the transceiver unit 703 is further configured to: when the first DRX parameter does not meet a transmission requirement of a second V2X service, send a third DRX parameter to the second terminal device based on the transmission requirement of the second V2X service, where the third DRX parameter is used by the communication apparatus 700 and the second terminal device to perform PC5 communication of the second V2X service; or send a fourth DRX parameter to the second terminal device based on the transmission requirement of the second V2X service and the transmission requirement of the first V2X service, where the fourth DRX parameter is used by the communication apparatus 700 and the second terminal device to perform PC5 communication of the first V2X service and the second V2X service.

In a possible design, when determining the first DRX parameter based on the transmission requirement of the first V2X service, the processing unit 702 is specifically configured to: send, by a V2X layer of the communication apparatus 700, the transmission requirement of the first V2X service to an access stratum of the communication apparatus 700; and determine, by the access stratum of the communication apparatus 700, the first DRX parameter based on the transmission requirement of the first V2X service. Optionally, the V2X layer of the communication apparatus 700 is further configured to send DRX indication information to the access stratum of the communication apparatus 700, where the DRX indication information indicates to obtain a DRX parameter for the communication apparatus 700. The access stratum of the communication apparatus 700 determines the first DRX parameter based on the DRX indication information and the transmission requirement of the first V2X service.

In a possible design, the transceiver unit 703 is further configured to receive a fifth DRX parameter of the communication apparatus 700 from a network device. When determining the first DRX parameter based on the transmission requirement of the first V2X service, the processing unit 702 is specifically configured to determine the first DRX parameter based on the transmission requirement of the first V2X service and the fifth DRX parameter of the communication apparatus 700.

In a possible design, the service requirement of the first V2X service includes a QoS parameter of at least one PC5 quality of service QoS flow that is for transmitting the first V2X service and that is between the communication apparatus 700 and the second terminal device, and the QoS parameter includes a data packet transmission delay requirement.

In a possible design, the at least one PC5 QoS flow includes a first PC5 QoS flow and a second PC5 QoS flow, and the first DRX parameter includes a DRX parameter corresponding to the first PC5 QoS flow and a DRX parameter corresponding to the second PC5 QoS flow, where the DRX parameter corresponding to the first PC5 QoS flow is used by the communication apparatus 700 and the second terminal device to perform PC5 communication of the first V2X service based on the first PC5 QoS flow, and the DRX parameter corresponding to the second PC5 QoS flow is used by the communication apparatus 700 and the second terminal device to perform PC5 communication of the first V2X service based on the second PC5 QoS flow.

In a possible design, when determining the first DRX parameter based on the transmission requirement of the first V2X service, the processing unit 702 is specifically configured to: determine, based on a QoS parameter of the first PC5 QoS flow, the DRX parameter corresponding to the first PC5 QoS flow; and determine, based on a QoS parameter of the second PC5 QoS flow, the DRX parameter corresponding to the second PC5 QoS flow.

In a possible design, the transceiver unit 703 is further configured to send the first DRX parameter to a network device.

In a possible design, the transceiver unit 703 is further configured to: send the second DRX parameter to a network device; or send the first DRX parameter and the second DRX parameter to the network device.

When the communication apparatus 700 is configured to implement the functions of the second terminal device in the method embodiment:

In a possible implementation, the transceiver unit 703 is configured to receive a first discontinuous reception DRX parameter from a first terminal device, where the first DRX parameter is used by the first terminal device and the communication apparatus 700 to perform PC5 communication of a first V2X service. The transceiver unit 703 is further configured to perform PC5 communication of the first V2X service with the first terminal device based on the first DRX parameter.

In a possible design, when performing PC5 communication of the first V2X service with the first terminal device based on the first DRX parameter, the transceiver unit 703 is specifically configured to: send data of the first V2X service to the first terminal device based on the first DRX parameter; or send data of the first V2X service to the first terminal device based on the first DRX parameter, and receive, based on the first DRX parameter, data that is of the first V2X service and that is sent by the first terminal device.

In a possible design, the transceiver unit 703 is further configured to receive a third DRX parameter from the first terminal device, where the third DRX parameter is used by the first terminal device and the communication apparatus 700 to perform PC5 communication of a second V2X service. The transceiver unit 703 is further configured to perform PC5 communication of the first V2X service and the second V2X service with the first terminal device based on the first DRX parameter and the third DRX parameter respectively.

In a possible design, the transceiver unit 703 is further configured to receive a fourth DRX parameter from the first terminal device, where the fourth DRX parameter is used by the first terminal device and the communication apparatus 700 to perform PC5 communication of the first V2X service and the second V2X service. The transceiver unit 703 is further configured to perform PC5 communication of the first V2X service and the second V2X service with the first terminal device based on the fourth DRX parameter.

In another possible implementation, the transceiver unit 703 is configured to receive a first discontinuous reception DRX parameter from a first terminal device, where the first DRX parameter is used by the first terminal device and the communication apparatus 700 to perform PC5 communication of a first V2X service. The processing unit 702 is configured to determine a second DRX parameter based on the first DRX parameter and/or a transmission requirement of one or more fourth V2X services, where the transmission requirement includes a service requirement and/or a message pattern, and the one or more fourth V2X services are a V2X service being performed by the communication apparatus 700. The transceiver unit 703 is further configured to send the second DRX parameter to the first terminal device, where the second DRX parameter is used by the first terminal device and the communication apparatus 700 to perform PC5 communication of the first V2X service. The transceiver unit 703 is further configured to perform PC5 communication of the first V2X service with the first terminal device based on the second DRX parameter, or perform PC5 communication of the first V2X service with the first terminal device based on the first DRX parameter and the second DRX parameter.

In a possible design, when determining the second DRX parameter based on the transmission requirement of the one or more fourth V2X services, the processing unit 702 is specifically configured to determine the second DRX parameter based on the transmission requirement of the one or more fourth V2X services and a transmission requirement of the first V2X service.

In a possible design, the first DRX parameter is carried in a first message, and the first message further includes the transmission requirement of the first V2X service or identification information of the first V2X service. If the first message includes the identification information of the first V2X service, the processing unit 702 is further configured to determine the transmission requirement of the first V2X service based on the identification information of the first V2X service.

In a possible design, when performing PC5 communication of the first V2X service with the first terminal device based on the second DRX parameter, the transceiver unit 703 is specifically configured to: send data of the first V2X service to the first terminal device based on the second DRX parameter; or receive, based on the second DRX parameter, data that is of the first V2X service and that is sent by the first terminal device, and send data of the first V2X service to the first terminal device based on the second DRX parameter.

In a possible design, when performing PC5 communication of the first V2X service with the first terminal device based on the first DRX parameter and the second DRX parameter, the transceiver unit 703 is specifically configured to: receive, based on the second DRX parameter, data that is of the first V2X service and that is sent by the first terminal device, and send data of the first V2X service to the first terminal device based on the first DRX parameter.

For more detailed descriptions of the processing unit 702 and the transceiver unit 703, directly refer to related descriptions in the method embodiment shown in FIG. 3, FIG. 4, FIG. 5, or FIG. 6. Details are not described herein again.

As shown in FIG. 8, a communication apparatus 800 includes a processor 810 and an interface circuit 820. The processor 810 and the interface circuit 820 are coupled to each other. It may be understood that the interface circuit 820 may be a transceiver or an input/output interface. Optionally, the communication apparatus 800 may further include a memory 830, configured to: store instructions to be executed by the processor 810, store input data required for running the instructions by the processor 810, or store data generated after the processor 810 runs the instructions.

When the communication apparatus 800 is configured to implement the method shown in FIG. 3, FIG. 4, FIG. 5, or FIG. 6, the processor 810 is configured to implement a function of the processing unit 702, the interface circuit 820 is configured to implement a function of the transceiver unit 703, and the memory 830 is configured to implement a function of the storage unit 701.

In another form of this embodiment, a computer-readable storage medium is provided. The computer-readable storage medium stores instructions. When the instructions are executed, the communication methods applicable to the first terminal device or the second terminal device in the foregoing method embodiments may be performed.

In another form of this embodiment, a computer program product including instructions is provided. When the instructions are executed, the communication methods applicable to the first terminal device or the second terminal device in the foregoing method embodiments may be performed.

In another form of this embodiment, a chip is provided. When the chip runs, the communication methods applicable to the first terminal device or the second terminal device in the foregoing method embodiments may be performed.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

It is clear that a person skilled in the art can make various modifications and variations to embodiments of this application without departing from the scope of embodiments of this application. This application is intended to cover these modifications and variations provided that they fall within the scope of protection defined by the following claims and their equivalent technologies.

What is claimed is:

1. A communication method, comprising:
   sending, by a vehicle-to-everything (V2X) layer of a first terminal device, a transmission requirement of a first V2X service to an access stratum of the first terminal device;
   determining, by the access stratum of the first terminal device, a first discontinuous reception (DRX) parameter based on a transmission requirement of the first V2X service, wherein the transmission requirement comprises a service requirement; and
   sending, by the first terminal device to a second terminal device, the first DRX parameter for proximity communication 5 (PC5) communication of the first V2X service between the first terminal device and the second terminal device.

2. The method according to claim 1, wherein the determining, by a first terminal device, a first DRX parameter based on a transmission requirement of a first V2X service comprises:
   determining, by the first terminal device, the first DRX parameter based on the transmission requirement of the first V2X service and a transmission requirement of a V2X service being performed by the first terminal device.

3. The method according to claim 1, wherein the method further comprises:
   receiving, by the first terminal device from the second terminal device, an acknowledgment message indicating that the second terminal device accepts the first DRX parameter; and
   performing, by the first terminal device, PC5 communication of the first V2X service with the second terminal device based on the first DRX parameter.

4. The method according to claim 1, wherein the method further comprises:
   receiving, by the first terminal device, a second message from the second terminal device, wherein the second message comprises a second DRX parameter for PC5 communication of the first V2X service between the first terminal device and the second terminal device; and
   performing, by the first terminal device, PC5 communication of the first V2X service with the second terminal device based on: the second DRX parameter, or the first DRX parameter and the second DRX parameter.

5. The method according to claim 4, wherein the performing, by the first terminal device, PC5 communication of the first V2X service with the second terminal device based on the first DRX parameter and the second DRX parameter comprises:
   receiving, by the first terminal device based on the first DRX parameter, data of the first V2X service from the second terminal device; and
   sending data of the first V2X service to the second terminal device based on the second DRX parameter.

6. The method according to claim 1, wherein the method further comprises:
sending, by the V2X layer of the first terminal device to the access stratum of the first terminal device, DRX indication information indicating to obtain a DRX parameter for the first terminal device; and
determining, by the access stratum of the first terminal device, the first DRX parameter based on the DRX indication information and the transmission requirement of the first V2X service.

7. The method according to claim 1, wherein the method further comprises:
receiving, by the first terminal device, a second DRX parameter of the first terminal device from a network device; and wherein
the determining the first DRX parameter comprises:
determining, by the first terminal device, the first DRX parameter based on the transmission requirement of the first V2X service and the second DRX parameter of the first terminal device.

8. The method according to claim 1, wherein the service requirement of the first V2X service comprises a quality of service (QOS) parameter of at least one PC5 QoS flow for transmitting the first V2X service, wherein the at least one PC5 QOS flow is between the first terminal device and the second terminal device, and wherein the QoS parameter comprises a data packet transmission delay requirement.

9. An apparatus, comprising:
at least one processor:
one or more memories storing programming instructions for execution by the at least one processor to:
receive, from a first terminal device, a first discontinuous reception (DRX) parameter for proximity communication 5 (PC5) communication of a first V2X service between the first terminal device and the apparatus, wherein the first DRX parameter is determined, by an access stratum of the first terminal device, based on a transmission requirement of a first vehicle-to-everything (V2X) service received from a V2X layer of the first terminal device, and wherein the transmission requirement comprises a service requirement; and
perform PC5 communication of the first V2X service with the first terminal device based on the first DRX parameter.

10. The apparatus according to claim 9, wherein the programming instructions are for execution by the at least one processor to:
send data of the first V2X service to the first terminal device based on the first DRX parameter; and
receive, based on the first DRX parameter, data of the first V2X service sent by the first terminal device.

11. The apparatus according to claim 9, wherein the programming instructions are for execution by the at least one processor to:
receive, from the first terminal device, a second DRX parameter for PC5 communication of a second V2X service between the first terminal device and the apparatus; and perform PC5 communication of the first V2X service and the second V2X service with the first terminal device based on the first DRX parameter and the second DRX parameter respectively; or
receive, from the first terminal device, a third DRX parameter for PC5 communication of the first V2X service and the second V2X service between the first terminal device and the apparatus; and perform PC5 communication of the first V2X service and the second V2X service with the first terminal device based on the third DRX parameter.

12. A communication apparatus, comprising:
at least one processor:
one or more memories storing programming instructions for execution by the at least one processor to:
send, by a vehicle-to-everything (V2X) layer, a transmission requirement of a first V2X service to an access stratum of the communication apparatus;
determine, by the access stratum, a first discontinuous reception (DRX) parameter based on a transmission requirement of the first V2X service, wherein the transmission requirement comprises a service requirement; and
send, to a second terminal device, the first DRX parameter for proximity communication 5 (PC5) communication of the first V2X service between the apparatus and the second terminal device.

13. The apparatus according to claim 12, wherein the programming instructions are for execution by the at least one processor to:
determine the first DRX parameter based on the transmission requirement of the first V2X service and a transmission requirement of a V2X service being performed by the apparatus.

14. The apparatus according to claim 12, wherein the programming instructions are for execution by the at least one processor to:
receive, from the second terminal device, an acknowledgment message indicating that the second terminal device accepts the first DRX parameter; and
perform PC5 communication of the first V2X service with the second terminal device based on the first DRX parameter.

15. The apparatus according to claim 12, wherein the programming instructions are for execution by the at least one processor to:
receive a second message from the second terminal device, wherein the second message comprises a second DRX parameter for PC5 communication of the first V2X service between the apparatus and the second terminal device; and
perform PC5 communication of the first V2X service with the second terminal device based on: the second DRX parameter, or the first DRX parameter and the second DRX parameter.

16. The apparatus according to claim 15, wherein the programming instructions are for execution by the at least one processor to:
receive, based on the first DRX parameter, data of the first V2X service from the second terminal device; and
send data of the first V2X service to the second terminal device based on the second DRX parameter.

17. The apparatus according to claim 12, wherein the programming instructions are for execution by the at least one processor to:
send, at the V2X layer of the apparatus to the access stratum of the apparatus, DRX indication information indicating to obtain a DRX parameter for the apparatus; and
determine, at the access stratum of the apparatus, the first DRX parameter based on the DRX indication information and the transmission requirement of the first V2X service.

18. The apparatus according to claim 12, wherein the programming instructions are for execution by the at least one processor to:
- receive a second DRX parameter of the apparatus from a network device; and
- determine the first DRX parameter based on the transmission requirement of the first V2X service and the second DRX parameter of the apparatus.

* * * * *